United States Patent
Ozarkar et al.

(10) Patent No.: US 11,343,247 B1
(45) Date of Patent: May 24, 2022

(54) LOCAL DELEGATION OF REMOTE KEY MANAGEMENT SERVICE

(71) Applicant: Equinix, Inc., Redwood City, CA (US)

(72) Inventors: Anand Ozarkar, San Jose, CA (US);
Naresh Kumar, Dublin, CA (US);
Imam Sheikh, Redwood City, CA (US)

(73) Assignee: Equinix, Inc., Redwood City, CA (US)

( * ) Notice: Subject to any disclaimer, the term of this patent is extended or adjusted under 35 U.S.C. 154(b) by 360 days.

(21) Appl. No.: 16/556,482

(22) Filed: Aug. 30, 2019

(51) Int. Cl.
*H04L 67/56* (2022.01)
*H04L 67/10* (2022.01)
*H04L 29/06* (2006.01)

(52) U.S. Cl.
CPC .......... *H04L 63/0884* (2013.01); *H04L 63/06* (2013.01); *H04L 67/28* (2013.01); *H04L 67/10* (2013.01)

(58) Field of Classification Search
CPC ..... H04L 63/0884; H04L 63/06; H04L 67/28; H04L 67/10
See application file for complete search history.

(56) References Cited

U.S. PATENT DOCUMENTS

| | | | |
|---|---|---|---|
| 9,886,267 | B2 | 2/2018 | Maheshwari et al. |
| 9,948,552 | B2 | 4/2018 | Teng et al. |
| 10,095,710 | B1 | 10/2018 | Whitmer |
| 10,129,078 | B2 | 11/2018 | Kumar et al. |
| 10,291,401 | B1 | 5/2019 | Norum |
| 10,771,252 | B1 | 9/2020 | Teng et al. |
| 2014/0082749 | A1 | 3/2014 | Holland et al. |
| 2015/0222606 | A1 | 8/2015 | Yan |
| 2015/0281189 | A1 | 10/2015 | Nayshtut et al. |
| 2015/0326467 | A1 | 11/2015 | Fullbright et al. |
| 2015/0358296 | A1 | 12/2015 | Everett |
| 2016/0127254 | A1 | 5/2016 | Kumar et al. |
| 2016/0337175 | A1 | 11/2016 | Rao |
| 2017/0093702 | A1 | 3/2017 | Teng et al. |

(Continued)

OTHER PUBLICATIONS

Sheikh, "5 Things We Learned From Our Customers About Multicloud Security," Interconnections—The Equinix Blog, Apr. 11, 2018, 3 pp.

(Continued)

*Primary Examiner* — Joe Chacko
(74) *Attorney, Agent, or Firm* — Shumaker & Sieffert, P.A.

(57) ABSTRACT

In general, techniques are described for proxying, with a locally-deployed computing device, service requests from one or more with customer devices to a remote data encryption and key management service and assuming, by the local computing device, the service functions of the remote service in the event of a remote service failure. For example, customer devices at a location may be configured to communicate service requests to the local computing device rather than to a remote service. The local computing device obtains one or more encryption keys or other security objects and stores the security objects to local storage. In response to determining a disruption in the remote service due to, e.g., network connectivity failure, the local computing device may assume the functionality of the remote service for a limited time by performing data encryption operations, responsive to requests received at the local computing device from the customer devices.

18 Claims, 18 Drawing Sheets

(56) References Cited

U.S. PATENT DOCUMENTS

| | | |
|---|---|---|
| 2017/0111220 A1 | 4/2017 | Kumar et al. |
| 2018/0109508 A1 | 4/2018 | Wall et al. |
| 2018/0367311 A1 | 12/2018 | Stahlberg et al. |
| 2019/0013936 A1 | 1/2019 | Murray et al. |
| 2019/0386814 A1 | 12/2019 | Ahmed |
| 2020/0104478 A1* | 4/2020 | Chauhan .................. G06F 16/27 |
| 2020/0195706 A1* | 6/2020 | Gillette ................... H04L 67/12 |

OTHER PUBLICATIONS

Weaver, "Can You Achieve HSM Security With Cloud Flexibility?," Interconnections—The Equnix Blog, Apr. 16, 2018, 3 pp.

"AWS CloudHSM: User Guide," Amazon Web Services, Inc., Apr. 30, 2018, 253 pp.

Shinn, "Encryption and Key Management in AWS," Amazon Web Services, 2015 (Applicant points out, in accordance with MPEP 609.04(a), that the year of publication, 2015, is sufficiently earlier than the effective U.S. filing date, 2019, so that the particular month of publication is not in issue.) 40 pp.

"Enabling Private Virtual Connections for Direct Cloud Access," Products and Services: Equinix Cloud Exchange for Financial Services, 2017 (Applicant points out, in accordance with MPEP 609 04(a), that the year of publication, 2017, is sufficiently earlier than the effective U.S. filing date, 2019, so that the particular month of publication is not in issue.) 2 pp.

Rosen et al., "BGP/MPLS IP Virtual Private Networks (VPNs)," Network Working Group, RFC 4364, Feb. 2006, 47 pp.

"Docker Overview," Docker, Inc., Retrieved from: https://web.archive.org/web/20160623192952/https://docs.docker.com/engine/understanding-docker/, accessed date Jun. 23, 2016, 9 pp.

Grattafiori, "Understanding and Hardening Linux Containers," NCC Group Whitepaper, Version 1.0, Apr. 20, 2016, 122 pp.

Costan et al., "Intel SGX Explained," Cryptology ePrint Archive: Report 2016/086, last revised Feb. 20, 2017 118 pp.

U.S. Appl. No. 16/006,458, filed Jun. 12, 2018, naming inventors Teng et al.

U.S. Appl. No. 17/013,178, filed Sep. 4, 2020, naming inventors Teng et al.

* cited by examiner

LOCAL DELEGATION OF REMOTE KEY MANAGEMENT SERVICE

TECHNICAL FIELD

This disclosure relates to computing systems, and more specifically, to encryption services for computer applications.

BACKGROUND

A hardware security module (HSM) is a computing device that stores, safeguards, and manages digital cryptographic keys, and also performs cryptographic operations. Typically, an HSM is a housed within a tamper-resistant casing and is designed to securely store cryptographic keys and other material. An HSM is also designed to perform cryptographic operations (e.g., encryption and decryption) without exposing unencrypted versions of the keys outside of the device, thereby preventing unauthorized disclosure of such keys. HSM devices sometimes take the form of a plug-in card or an external device that attaches directly to another computing device.

SUMMARY

In general, techniques are described for proxying, with a locally-deployed computing device, service requests from one or more with customer devices to a remote data encryption and key management service and assuming, by the local computing device, the service functions of the remote service in the event of a remote service failure. For example, customer devices at a location may be configured to communicate encryption and key-related service requests to the local computing device rather than to a remote service. The local computing device intercepts one or more encryption keys or other security objects from remote service or the customer devices and stores the security objects to local storage. In response to determining a disruption in the remote service due to, e.g., network connectivity failure, the local computing device may assume the functionality of the remote service for a limited time by performing data encryption operations, responsive to requests received at the local computing device from the customer devices.

The techniques may provide one or more technical advantages for realizing at least one practical application. For example, the techniques may improve the robustness of a key management service by enabling encryption operations to be performed locally when the remote service is disrupted. As a result, users of a remote key management and data encryption service may continue to make use of service functionality as normal for a limited time, or until such time as the remote service has been restored. As another example, the techniques may facilitate scalability of and lower latency communications for the key management and data encryption service by permitting the remote service to temporarily offload, in the case of high utilization rates or network congestions, responsibility for data encryption services to local devices to support the service on the local networks. As another example, by inserting a mediation/proxying layer between customer devices and the remote service and allocating different API or other access keys for the remote service to the local computing devices, the techniques may reduce an attack surface for an application that uses the remote service and, in some cases, reduce a management or administrative burden with respect to the access keys by configuring multiple customer devices at a location to send service requests to a local computing device and enforcing, by the local computing device, mediated communications with the remote service.

In some examples, a method includes authenticating a local computing device to a remote key management service (KMS) accessible to the local computing device via a network, wherein the remote KMS provides services comprising one or more of data encryption services and key management services; obtaining, by the local computing device, an encryption key from the remote KMS; storing, by the computing device, the encryption key in a local key store; proxying, by the local computing device, first service traffic between one or more customer devices and the remote KMS; transitioning, by the local computing device, a mode of the local computing device into offline mode; receiving, by the local computing device, second service traffic from the one or more customer devices; and processing, by the local computing device based on the mode of the local computing device being offline mode, the second service traffic using the encryption key.

In some examples, a computing device includes processing circuitry coupled to a memory, configured to obtain an encryption key from a remote KMS that provides services comprising one or more of data encryption services and key management services; store an encryption key in a local key store; proxy first service traffic between one or more customer devices and the remote KMS; transition a mode of the local computing device into offline mode; receive second service traffic from the one or more customer devices; and process, based on the mode of the local computing device being offline mode, the second service traffic using the encryption key.

In some examples, a computer-readable storage medium is configured with instructions for causing a computing device to perform operations including operations comprising obtaining an encryption key from a remote KMS that provides services comprising one or more of data encryption services and key management services; storing an encryption key in a local key store; proxying first service traffic between one or more customer devices and the remote KMS; transitioning a mode of the local computing device into offline mode; receiving second service traffic from the one or more customer devices; and processing, based on the mode of the local computing device being offline mode, the second service traffic using the encryption key.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Like reference characters denote like elements throughout the figures and text.

DETAILED DESCRIPTION

Figure 1:
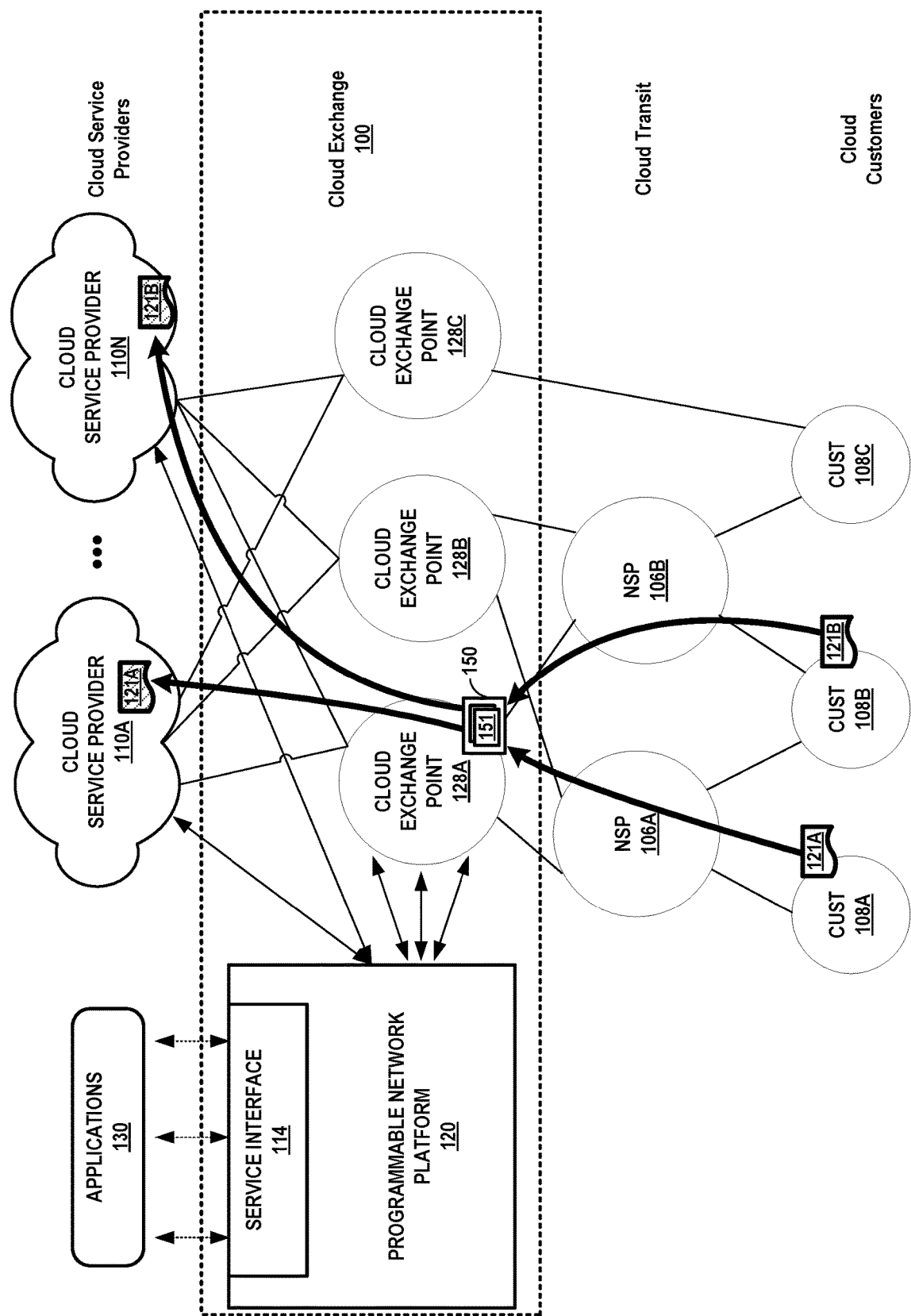
FIG. 1 is a block diagram that illustrates a conceptual view of a network system having a metro-based cloud exchange that provides multiple cloud exchange points according to techniques described herein.

FIG. 1 illustrates a conceptual view of a network system having a metro-based cloud exchange that provides multiple cloud exchange points according to techniques described herein. Each of cloud-based services exchange points 128A-128D (described hereinafter as "cloud exchange points" and collectively referred to as "cloud exchange points 128") of cloud-based services exchange 100 ("cloud exchange 100") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers operating computing devices 108A-108C (collectively, "customer computing devices 108") receive cloud services from multiple cloud service provider networks 110A-110N (collectively, "cloud service providers 110" or "cloud service provider networks 110"). Customer computing devices 108 may be computing devices of corresponding customer networks co-located within the corresponding data center of one of cloud exchange points 128, or customer networks that receive services via transit network service providers 106, as illustrated in FIG. 1. Cloud exchange 100 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively. Cloud exchange 100 allows private networks of any customer to be directly cross-connected to any other customer at a common point, thereby allowing direct exchange of network traffic between the networks of the customers.

Cloud customers operating computing devices 108 may receive cloud-based services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or more devices 108. NSPs 106 may peer, at layer 3, directly with one or more cloud exchange points 128 and in so doing offer indirect layer 3 connectivity and peering to one or more customer devices 108 by which customers (e.g., operating devices 108) may obtain cloud services from the cloud exchange 100. Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to customer devices 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers would maintain on a pair-wise basis. Instead, a customer may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, one customer may have contracted with a cloud exchange provider for cloud exchange 100 to directly access layer 3 cloud services via cloud exchange points 128C. In this way, that customer receives redundant layer 3 connectivity to cloud service provider 110A, for instance. The customer at device 108C, in contrast, is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. A customer at device 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer networks, all having at least one port offering connectivity within one or more of the cloud exchange points 128.

In some examples, cloud exchange 100 allows a corresponding one of customers of any network service providers (NSPs) or "carriers" 106A-106B (collectively, "carriers 106") or other cloud customers including a customer operating device 108C to be directly connected, via a virtual layer 2 (L2) or layer 3 (L3) connection to any other customer network and/or to any of CSPs 110, thereby allowing direct exchange of network traffic among the customer networks and CSPs 110. The virtual L2 or L3 connection may be referred to as a "virtual circuit."

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers operating devices 108 may already have network presence, such as by having one or more accessible ports available for interconnection within the data center, which may represent any of cloud exchange points 128. This allows the participating carriers, customers, and CSPs to have a wide range of interconnectivity options within the same facility. A carrier/customer may in this way have options to create many-to-many interconnections with only a one-time hook up to one or more cloud exchange points 128. In other words, instead of having to establish separate connections across transit networks to access different cloud service providers or different cloud services of one or more cloud service providers, cloud exchange 100 allows customers to interconnect to multiple CSPs and cloud services.

In the example of FIG. 1, cloud exchange point 128A includes computing system 150, which may provide access to one or more hardware security modules 151 included within or connected to computing system 150. In FIG. 1, computing system 150 is shown within cloud exchange point 128A. In other examples, computing system 150 may be implemented outside of cloud exchange point 128A. Alternatively, or in addition, one or more computing systems 150 may be included within other cloud exchange points 128 (e.g., cloud exchange point 128B, cloud exchange point 128N) or elsewhere within cloud exchange 100.

In some examples, each hardware security module 151 shown within computing system 150 is a computing device that stores, safeguards, and manages digital cryptographic keys and also performs cryptographic operations. Each hardware security module 151 may be designed as a tamper-resistant device that prevents or foils attempts at hacking or disassembly. In some examples, hardware security module 151 may be constructed to ensure that cryptographic keys stored within hardware security module 151 are stored so that the keys cannot be read or accessed by any other device. Further, in some examples, each hardware security module 151 may be configured to disable itself and/or delete the content that it stores upon detecting an attempt at tampering. In general, hardware security module 151 may be designed to adhere to rigorous requirements and pass stringent product verification testing and/or application testing to verify the ability of hardware security module 151 to maintain the security and integrity of cryptographic material stored therein. One or more of hardware security modules 151 may be included within computing system 150, or such devices may be configured as external devices that attach to computing system 150.

In some examples, hardware security module 151 may be programmable to enable customers to modify or extend the behavior and functionality of hardware security module 151. For instance, hardware security module 151 may be used to provide services to countries, jurisdictions, entities that require specific cryptographic algorithms that might not be implemented by hardware security module 151. In such an example, hardware security module 151 may be capable of executing customer-provided code (or other custom code) that implements one or more cryptographic algorithms satisfying arbitrary requirements of one or more countries, jurisdictions, and/or entities. Such a capability may also be used to comply with data privacy regulations that may be imposed by one or more countries. Such customizations and/or extensions may be also applied to implement other types of capabilities, including any given business logic that might be required by a specific customer.

Cloud exchange 100 includes a programmable network platform 120 for dynamically programming cloud exchange 100 to responsively and assuredly fulfill service requests that encapsulate business requirements for services provided by cloud exchange 100 and/or cloud service providers 110 coupled to the cloud exchange 100. The programmable network platform 120 may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the cloud exchange 100 to dynamically configure and manage the cloud exchange 100 to, for instance, facilitate virtual connections for cloud-based services delivery from multiple cloud service providers 110 to one or more cloud customers operating devices 108. The cloud exchange 100 may enable cloud customers to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 120 enables the cloud service provider to configure cloud exchange 100 with a L3 instance requested by a cloud customer operating device 108, as described herein. A customer may request an L3 instance to link multiple cloud service providers by the L3 instance, for example (e.g., for transferring the customer's data between two cloud service providers, or for obtaining a mesh of services from multiple cloud service providers).

Programmable network platform 120 may represent an application executing within one or more data centers of the cloud exchange 100 or alternatively, off-site at a back office or branch of the cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning for multiple different cloud exchanges. Alternatively or additionally, multiple separate instances of the programmable network platform 120 may control service provisioning for respective multiple different cloud exchanges.

In the illustrated example, programmable network platform 120 includes a service interface (or "service API") 114 that defines the methods, fields, and/or other software primitives by which applications 130, such as a customer portal, may invoke the programmable network platform 120. The service interface 114 may allow carriers 106, customers, cloud service providers 110, and/or the cloud exchange provider programmable access to capabilities and assets of the cloud exchange 100 according to techniques described herein.

For example, the service interface 114 may facilitate machine-to-machine communication to enable dynamic provisioning of virtual circuits in the cloud exchange for interconnecting customer and/or cloud service provider networks. In this way, the programmable network platform 120 enables the automation of aspects of cloud services provisioning. For example, the service interface 114 may provide an automated and seamless way for customers to establish, de-install and manage interconnections among multiple, different cloud providers participating in the cloud exchange.

In the example of FIG. 1, and in accordance with one or more aspects of the present disclosure, computing system 150 may provide services to authenticated users of cloud exchange 100. For instance, in the example of FIG. 1, programmable network platform 120 detects input, through service interface 114, that it determines corresponds to authentication credentials from users of customer computing device 108A, customer computing device 108B, and/or one or more other customer computing devices. Programmable network platform 120 outputs information about the input to computing system 150. Computing system 150 evaluates that the authentication credentials and determines that each of the users of customer computing device 108A and customer computing device 108B are authorized to access some or all services provided by cloud exchange point 128A, including cryptographic key use and management services provided by computing system 150 and hardware security modules 151.

Computing system 150 may encrypt data 121A received from customer computing device 108A, e.g., via a private communication channel such as a virtual circuit. For instance, in the example of FIG. 1, customer computing device 108A outputs one or more signals over network service provider 106A. Network service provider 106A communicates the signals to programmable network platform 120 through service interface 114. Programmable network platform 120 outputs information about the signals to computing system 150 within cloud exchange point 128A. Computing system 150 determines that the signals include data 121A. Computing system 150 further determines that the signals correspond to a request, by an authenticated user of customer computing device 108A, to create an encryption key, encrypt data 121A, and send, e.g., via a separate private communication channel such as a virtual circuit, encrypted data 121A for storage within cloud service provider network 110A. Computing system 150 causes one or more hardware security modules 151 to generate an encryption key and associate the encryption key with the authenticated user of customer computing device 108A. Hardware security module 151 uses the encryption key to encrypt data 121A (designated by shaded 121A). Computing system 150 outputs encrypted data 121A to cloud service provider network 110A for storage at one or more devices within cloud service provider network 110A.

Concurrently, or at a different time, computing system 150 may encrypt data 121B received from customer computing device 108B. For instance, in the example of FIG. 1, customer computing device 108B outputs one or more signals over network service provider 106A. Network service provider 106A communicates the signals to programmable network platform 120 (e.g., through service interface 114) and information about the signals is communicated to computing system 150. Computing system 150 determines that the signals include data 121B from customer computing device 108B. Computing system 150 further determines that the signals correspond to a request, by an authenticated user of customer computing device 108B, to create an encryption key associated with the user of customer computing device 108B, encrypt data 121B, and store encrypted data 121B within cloud service provider network 110N. Computing system 150 causes one or more hardware security modules 151 to generate an encryption key and associate the encryption key with the authenticated user of customer computing device 108B. Hardware security module 151 uses the encryption key to encrypt data 121B. Computing system 150 outputs encrypted data 121B to cloud service provider network 110N for storage at one or more devices within cloud service provider network 110N.

In the example described, the user operating customer computing device 108A and the user operating customer computing device 108B may encrypt the data using keys separately generated by hardware security module 151, and may choose any of cloud service provider networks 110 for storage of the data 121A and/or data 121B. Further, either or both of data 121A and 121B data may be stored at multiple cloud service provider networks 110.

In some examples, computing system 150 may further provide key management services, enabling customers control over the encryption keys they create and that are used to protect data associated with each customer. In some examples, such key management services provided by computing system 150 may enable customers to access an API (e.g., through service interface 114) to, for example, organize or manage what specific named keys can be used to encrypt or decrypt specific data. Further, such services may be used to create, import, rotate, disable, and/or delete cryptographic keys and/or other key material. In some examples, computing system 150 may also enable customers to define usage policies for cryptographic material and/or audit the use of cryptographic or encryption keys. In such examples, hardware security module 151 may be used for secure storage of the encryption keys. In response to a request, e.g., via an API, computing system 150 may read the encryption keys from the hardware security module 151 and provide these encryption keys to other devices for use in encrypting/decrypting data.

In some examples, key management services provided by computing system 150 may also include a whitelisting service that restricts access to cryptographic services to an approved list of jurisdictions. In such an example, computing system 150 may, prior to servicing requests, inspect information about the source of the data or the location of the user interacting with cloud exchange 100 (or computing system 150) to ensure that the source or location is included within the approved list of jurisdictions. In some examples, computing system 150 inspect the IP address of one or more devices involved in the request. In other examples, computing system 150 may identify a source or location through other means.

Further, in some examples, key management services may, alternatively or in addition, include replication services that enable, for example, keys created within 151 to be replicated across each of cloud exchange points 128 in FIG. 1 or across multiple cloud exchanges 100. For instance, in some examples, each of cloud exchange points 128 may provide key management services to a particular customer. Further, in some examples, multiple cloud exchanges 100, perhaps widely dispersed geographically, may also provide key management services to that same customer. In such an example, when that customer creates a cryptographic key (e.g., through interactions with hardware security module 151), each of cloud exchange points 128 and/or cloud exchanges 100 may interact to ensure that the newly created key is replicated across some or all of cloud exchange points 128 and across other cloud exchanges 100, and is thereby available to that customer when accessing services through other cloud exchange points 128 and/or other cloud exchanges 100. Accordingly, one or more cryptographic keys may be duplicated in one geographic location, or duplicated in multiple locations across various geographical locations. To implement such functionality, keys may be stored in a common database accessible to one or more cloud exchange points 128 and/or one or more cloud exchanges 100. Further, although FIG. 1 illustrates one particular topology, techniques in accordance with one or more aspects of the present disclosure may be implemented using other topologies, including a hybrid topology that encompasses or includes both a full mesh topology and a hub-spoke topology.

Further example details of a cloud-based services exchange can be found in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Figure 2:
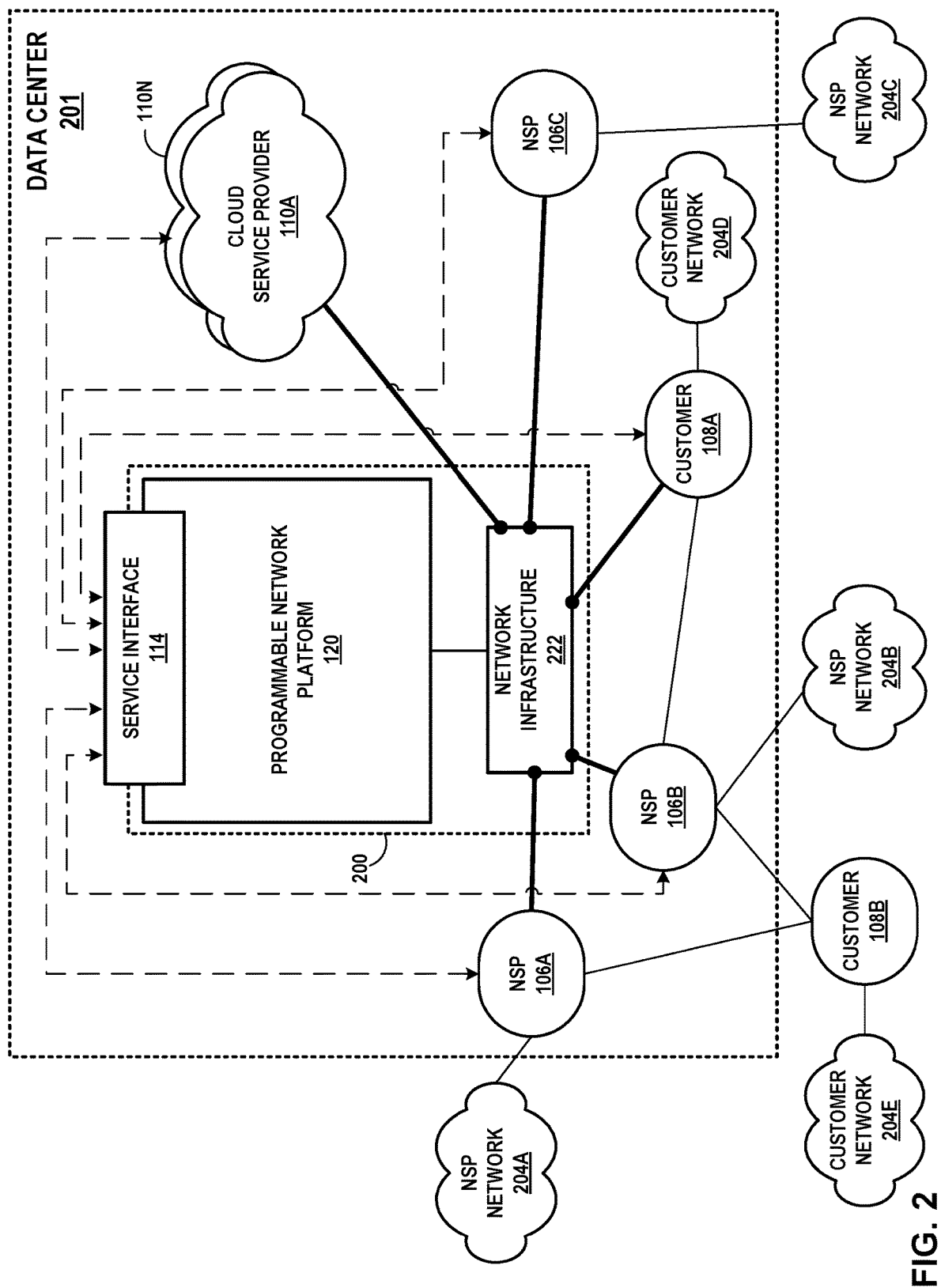
FIG. 2 is a block diagram illustrating a high-level view of a data center that provides an operating environment for a cloud-based services exchange, according to techniques described herein.

FIG. 2 is a block diagram illustrating a high-level view of a data center 201 that provides an operating environment for a cloud-based services exchange 200, according to techniques described herein. Cloud-based services exchange 200 ("cloud exchange 200") allows a corresponding one of customer networks 204D, 204E and NSP networks 204A-204C (collectively, "'private' or 'carrier' networks 204") of any NSPs 106A-106C or other cloud customers including customers 108A, 108B to be directly connected, via a layer 3 (L3) or layer 2 (L2) connection to any other customer network and/or to any of cloud service providers 110A-110N, thereby allowing exchange of cloud service traffic among the customer networks and/or CSPs 110. Data center 201 may be entirely located within a centralized area, such as a warehouse or localized data center complex, and provide power, cabling, security, and other services to NSPs, customers, and cloud service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access cloud services offered by CSPs 110 via the cloud exchange 200. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 200.

In this way, cloud exchange 200 streamlines and simplifies the process of partnering CSPs 110 and customers 108 (indirectly via NSPs 106 or directly) in a transparent and neutral manner. One example application of cloud exchange 200 is a co-location and interconnection data center in which CSPs 110, NSPs 106 and/or customers 108 may already have network presence, such as by having one or more accessible ports available for interconnection within the data center. This allows the participating carriers, customers, and CSPs to have a wide range of interconnectivity options in the same facility.

Cloud exchange 200 of data center 201 includes network infrastructure 222 that provides a L2/L3 switching fabric by which CSPs 110 and customers/NSPs interconnect. This enables an NSP/customer to have options to create many-to-many interconnections with only a one-time hook up to the switching network and underlying network infrastructure 222 that presents an interconnection platform for cloud exchange 200. In other words, instead of having to establish separate connections across transit networks to access different cloud service providers or different cloud services of one or more cloud service providers, cloud exchange 200 allows customers to interconnect to multiple CSPs and cloud services using network infrastructure 222 within data center 201, which may represent any of the edge networks described in this disclosure, at least in part.

By using cloud exchange 200, customers can purchase services and reach out to many end users in many different geographical areas without incurring the same expenses typically associated with installing and maintaining multiple virtual connections with multiple CSPs 110. For example, NSP 106A can expand its services using network 204B of NSP 106B. By connecting to cloud exchange 200, a NSP 106 may be able to generate additional revenue by offering to sell its network services to the other carriers. For example, NSP 106C can offer the opportunity to use NSP network 204C to the other NSPs.

Cloud exchange 200 includes an programmable network platform 120 that exposes at least one service interface, which may include in some examples and are alternatively referred to herein as application programming interfaces (APIs) in that the APIs define the methods, fields, and/or other software primitives by which applications may invoke the programmable network platform 120. The software interfaces allow NSPs 206 and customers 108 programmable access to capabilities and assets of the cloud exchange 200. The programmable network platform 120 may alternatively be referred to as a controller, provisioning platform, provisioning system, service orchestration system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 200 (e.g., customers 108 and NSPs 206) to create software applications that allow and leverage access to the programmable network platform 120 by which the applications may request that the cloud exchange 200 establish connectivity between the customer and cloud services offered by any of the CSPs 110. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to or between cloud service providers, delete virtual circuits, obtain active virtual circuit information, obtain details surrounding CSPs partnered with the cloud exchange provider, obtain customized analytics data, validate partner access to interconnection assets, and assure service delivery.

On the cloud service provider seller side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

Service interface 114 facilitates machine-to-machine communication to enable dynamic service provisioning and service delivery assurance. In this way, the programmable network platform 120 enables the automation of aspects of cloud services provisioning. For example, the software interfaces may provide an automated and seamless way for customers to establish, de-install and manage interconnection with or between multiple, different cloud providers participating in the cloud exchange. The programmable network platform 120 may in various examples execute on one or virtual machines and/or real servers of data center 201, or off-site.

In the example of FIG. 2, network infrastructure 222 represents the cloud exchange switching fabric and includes multiple ports that may be dynamically interconnected with virtual circuits by, e.g., invoking service interface 114 of the programmable network platform 120. Each of the ports is associated with one of carriers 106, customers 108, and CSPs 110.

In some examples, a cloud exchange seller (e.g., an enterprise or a CSP nested in a CSP) may request and obtain an L3 instance, and may then create a seller profile associated with the L3 instance, and subsequently operate as a seller on the cloud exchange. The techniques of this disclosure enable multiple CSPs to participate in an Enterprise's L3 instance (e.g., an L3 "routed instance" or L2 "bridged instance") without each CSP flow being anchored with an enterprise device.

In some aspects, the programmable network platform may provision a cloud exchange to deliver services made up of multiple constituent services provided by multiple different cloud service providers, where this is provided via the L3 instance as a service described herein. Each of these constituent services is referred to herein as a "micro-service" in that it is part of an overall service applied to service traffic. That is, a plurality of micro-services may be applied to service traffic in a particular "arrangement," "ordering," or "topology," in order to make up an overall service for the service traffic. The micro-services themselves may be applied or offered by the cloud service providers 110.

Figure 3A:
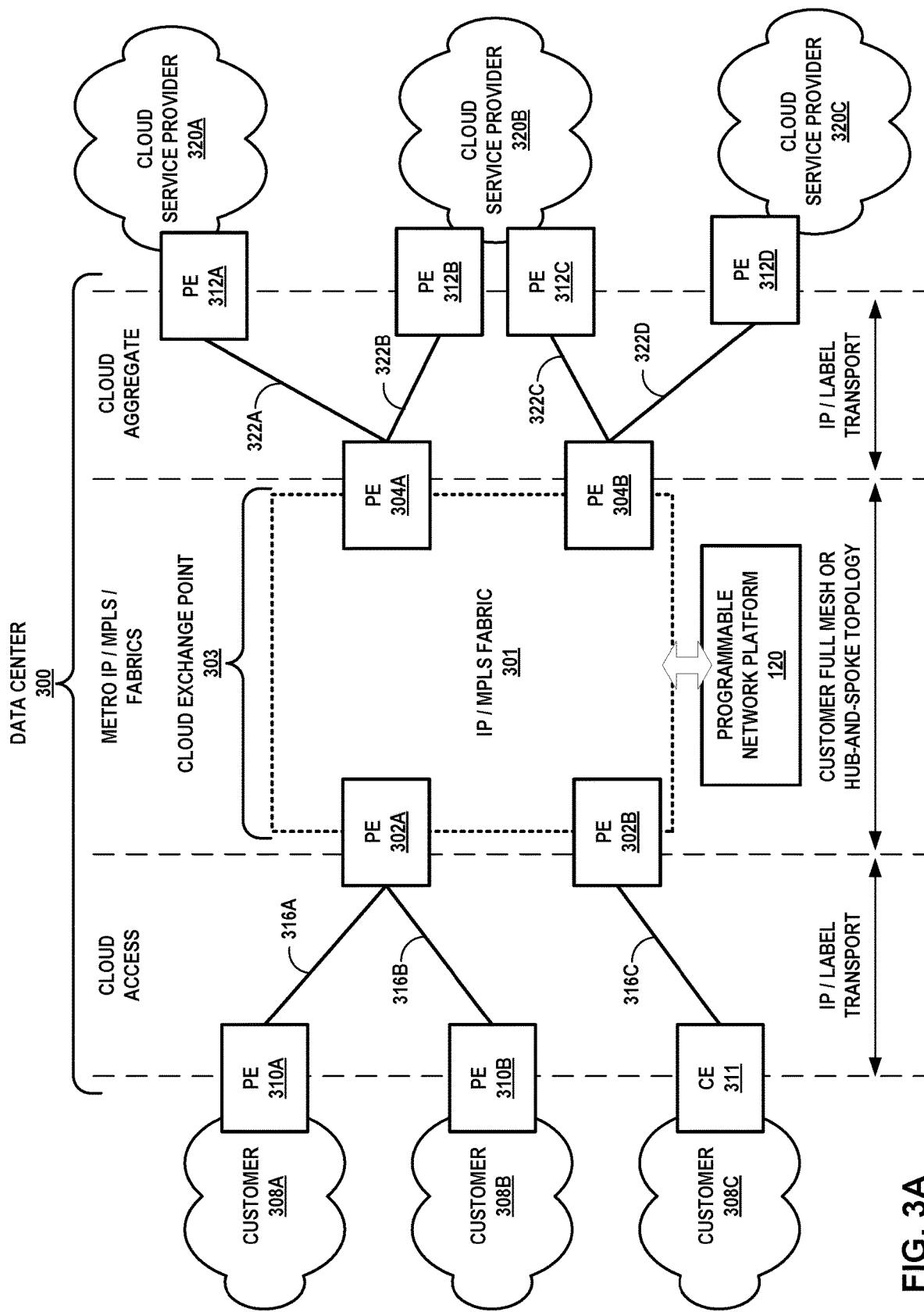
FIG. 3A and FIG. 3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in accordance with techniques described in this disclosure.
Figure 3B:
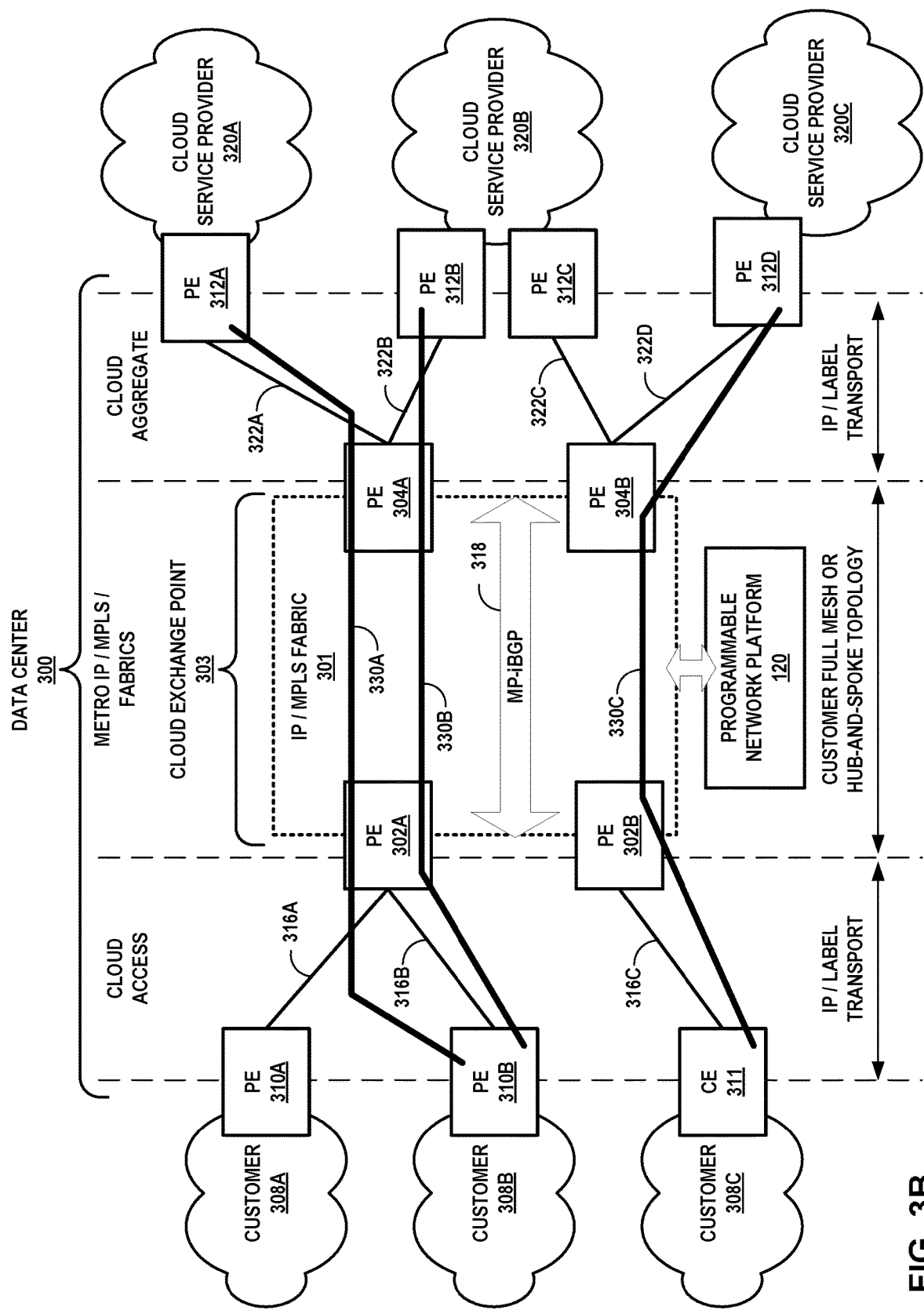

FIG. 3A and FIG. 3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in accordance with techniques described in this disclosure. In this example, customer networks 308A-308C (collectively, "customer networks 308"), each associated with a different customer, access a cloud exchange point within a data center 300 in order receive aggregated cloud services from one or more cloud service provider networks 320, each associated with a different cloud service provider 110. In some examples, customer networks 308 each include endpoint devices that consume cloud services provided by cloud service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g, QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and cloud service provider networks 320. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to multiple cloud service providers 320.

To create an L2 interconnection between a customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. In some cases, a cloud service provider 320 and customer 308 may have access links to the same PE router 302, 304, which bridges the L2 traffic using the bridge domain.

To create an L3 interconnection between a customer network 308 and a cloud service provider network 320, in some examples, IP/MPLS fabric 301 is configured with L3 virtual routing and forwarding instances (VRFs), as described in further detail below with respect to FIG. 4. In some cases, IP/MPLS fabric 301 may be configured with an L3 instance that includes one or more VRFs, and the L3 instance may link multiple cloud service provider networks 320. In this case, a customer network 308 might not need to be interconnected or have any physical presence in the cloud exchange or data center.

Each of access links 316 and aggregation links 322 may include a network interface device (NID) that connects customer network 308 or cloud service provider 328 to a network link between the NID and one of PE routers 302, 304. Each of access links 316 and aggregation links 322 may represent or include any of a number of different types of links that provide L2 and/or L3 connectivity.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of any of cloud exchange points 128. Data center 300 may represent an example of data center 201.

Cloud exchange point 303, in some examples, aggregates customers 308 access to the cloud exchange point 303 and thence to any one or more cloud service providers 320. FIG. 3A and FIG. 3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308. That is, the cloud service provider operating cloud service provider network 302A does not need to provision and configure separate service links from cloud service provider network 302A to each of PE routers 310, 311, for instance, in order to provide services to each of customer network 308. Cloud exchange point 303 may instead connect cloud aggregation link 322A and PE 312A of cloud service provider network 320A to multiple cloud access links 316 to provide layer 3 peering and network reachability for the cloud services delivery.

In addition, a single customer network, e.g., customer network 308A, need only to have configured a single cloud access link (here, access link 316A) to the cloud exchange point 303 within data center 300 in order to obtain services from multiple cloud service provider networks 320 offering cloud services via the cloud exchange point 303. That is, the customer or network service provider operating customer network 308A does not need to provision and configure separate service links connecting customer network 308A to different PE routers 312, for instance, in order to obtain services from multiple cloud service provider networks 320. Cloud exchange point 303 may instead connect cloud access link 316A (again, as one example) to multiple cloud aggregate links 322 to provide layer 3 peering and network reachability for the cloud services delivery to customer network 308A.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A-312D that each executes an exterior gateway routing protocol, e.g., eBGP, to exchange routes with PE routers 304A-304B (collectively, "PE routers 304") of cloud exchange point 303. Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple cloud service provider networks 320 to provide a data center-based 'transport' and layer 3 connection.

Whereas service provider-based IP backbone networks require wide-area network (WAN) connections with limited bandwidth to transport service traffic from layer 3 services providers to customers, the cloud exchange point 303 as described herein 'transports' service traffic and connects cloud service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and cloud service provider network 320 may connect via respective links to the same PE router of IP/MPLS fabric 301.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over access link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310.

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 might not peer directly with one another to exchange routes, but rather indirectly exchange routes via IP/MPLS fabric 301. In the example of FIG. 3B, cloud exchange point 303 is configured to implement multiple layer 3 virtual circuits 330A-330C (collectively, "virtual circuits 330") to interconnect customer network 308 and cloud service provider networks 322 with end-to-end IP paths. Each of cloud service providers 320 and customers 308 may be an endpoint for multiple virtual circuits 330, with multiple virtual circuits 330 traversing one or more attachment circuits between a PE/PE or PE/CE pair for the IP/MPLS fabric 301 and the CSP/customer. A virtual circuit 330 represents a layer 3 path through IP/MPLS fabric 301 between an attachment circuit connecting a customer network to the fabric 301 and an attachment circuit connecting a cloud service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from cloud service provider network 320A to customer network 308B. In the example of virtual circuit 330B, PE routers 312B, 304A, 302A, and 310B exchange routes for customer network 308B and cloud service provider 320B in a manner similar to that described above for establishing virtual circuit 330B. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B having a single access link 316B to the cloud exchange point 303.

Absent the techniques described herein, fully interconnecting customer networks 308 and cloud service provider networks 320 would require 3×3 peering connections between each of PEs 310 and at least one of PEs 312 for each of cloud service provider networks 320. For instance, PE 310A would require a layer 3 peering connection with each of PEs 312. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP VPNs or other IP-VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3 VPN of IP/MPLS fabric 301 together with extranets of any of customer networks 308 and any of cloud service provider networks 320 attached to the basic backbone L3VPN.

Each advanced L3VPN constitutes a cloud service delivery network from a cloud service provider network 320 to one or more customer networks 308, and vice-versa. In this way, cloud exchange point 303 enables any cloud service provider network 320 to exchange cloud service traffic with any customer network 308 while internalizing the layer 3 routing protocol peering connections that would otherwise be established between pairs of customer networks 308 and cloud service provider networks 320 for any cloud service connection between a given pair. In other words, the cloud exchange point 303 allows each of customer networks 308 and cloud service provider networks 320 to establish a single (or more for redundancy or other reasons) layer 3 routing protocol peering connection to the data center-based layer 3 connect. By filtering routes from cloud service provider networks 320 to customer networks 308, and vice-versa, PEs 302, 304 thereby control the establishment of virtual circuits 330 and the flow of associated cloud service traffic between customer networks 308 and cloud service provider networks 320 within a data center 300. Routes distributed into MP-iBGP mesh 318 may be VPN-IPv4 routes and be associated with route distinguishers to distinguish routes from different sites having overlapping address spaces.

Programmable network platform 120 may receive service requests for creating, reading, updating, and/or deleting end-to-end services of the cloud exchange point 303. In response, programmable network platform 120 may configure PEs 302, 304 and/or other network infrastructure of IP/MPLS fabric 301 to provision or obtain performance or other operations information regarding the service. Operations for provisioning a service and performed by programmable network platform 120 may include configuring or updating VRFs, installing SDN forwarding information, configuring LSPs or other tunnels, configuring BGP, configuring access links 316 and aggregation links 322, or otherwise modifying the configuration of the IP/MPLS fabric 301. Other operations may include making service requests to an orchestration system for cloud service provider networks 320, as described in further detail below.

Figure 4:
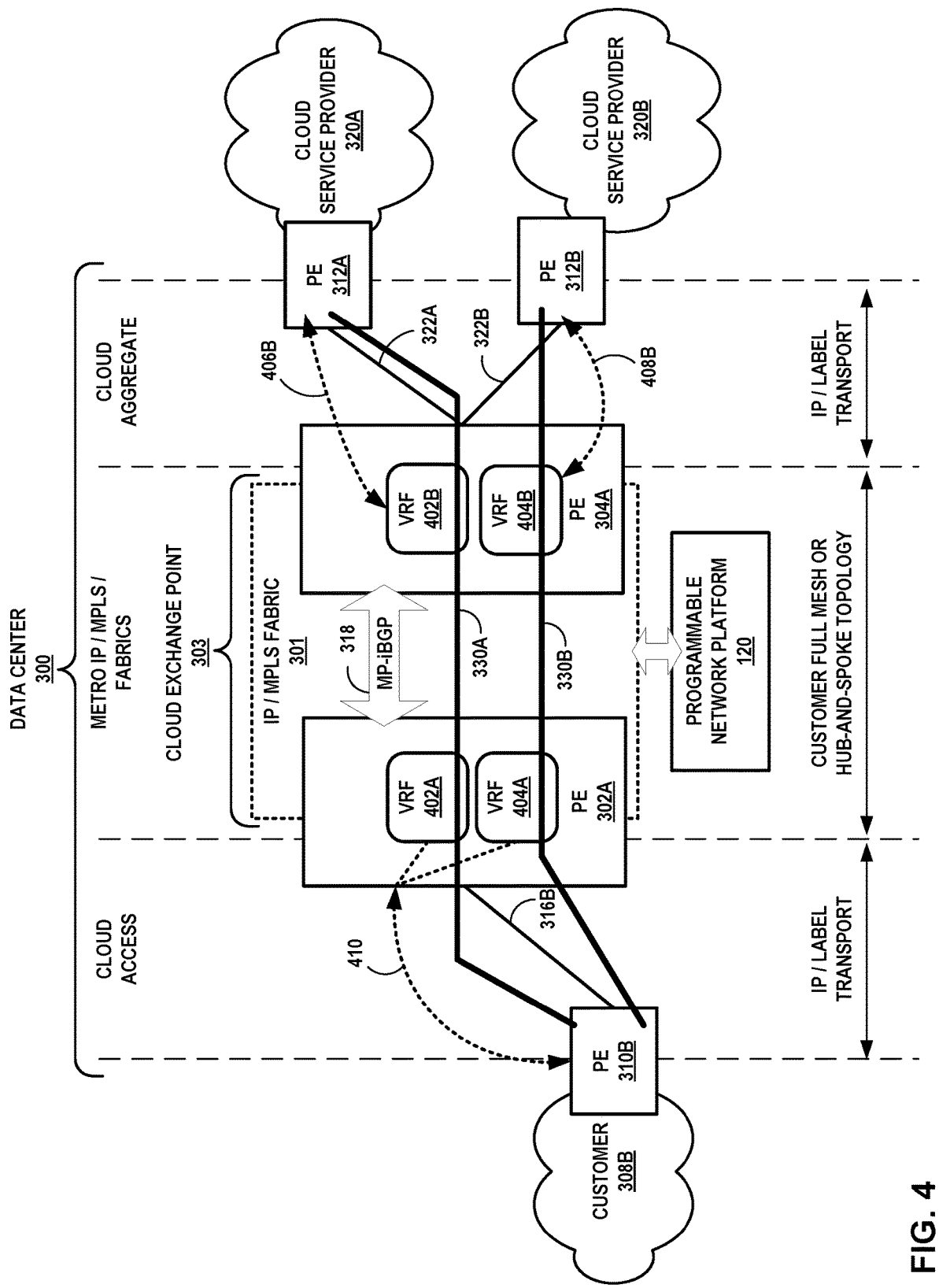
FIG. 4 is a block diagram illustrating an example of a data center-based cloud exchange point in which routers of the cloud exchange point are configured by programmable network platform with VPN routing and forwarding instances for routing and forwarding aggregated service traffic from multiple cloud service provider networks to a customer network, according to techniques described herein.

FIG. 4 is a block diagram illustrating an example of a data center-based cloud exchange point in which routers of the cloud exchange point are configured by programmable network platform 120 with VPN routing and forwarding instances for routing and forwarding aggregated service traffic from multiple cloud service provider networks to a customer network, according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 402B, and VRF 402B is configured to import routes exported by VRF 402A. The configuration may include asymmetric route targets for import/export between VRFs 402A, 402B. This configuration whereby a customer can access multiple layer 3 services from different CSPs each associated with separate VRFs to access the layer 3 services provides isolation of respective traffic exchanged with the CSPs. In some examples, PE 302A may be configured with a single VRF to import routes exported by both VRF 402B and VRF 404B. As noted above with respect to FIG. 3A and FIG. 3B, PEs 302, 304 may be further configured to bridge layer 2 traffic between customer 308B and cloud service providers 320.

In this example, PE 304A operates BGP or other route distribution protocol peering connections 406B, 408B with respective PEs 312A, 312B to exchange routes with respective cloud service provider networks 320A, 320B. PE 302A operates a BGP or other route distribution protocol peering connection 410 with PE 310B to exchange routes with customer network 308B. In some examples, PEs 302A, 304A may be statically configured with routes for the site networks.

An administrator or a programmable network platform described herein for cloud exchange point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE 310B nor any of PEs 302A, 304A need access to the full Internet BGP routing table to reach cloud service provider networks 320 or customer networks 308. Moreover, PEs 302A, 304A may be configured to aggregate customer/CSP routes and/or service traffic based on any one or more of physical, IP, service, and VRFs.

Figure 5:
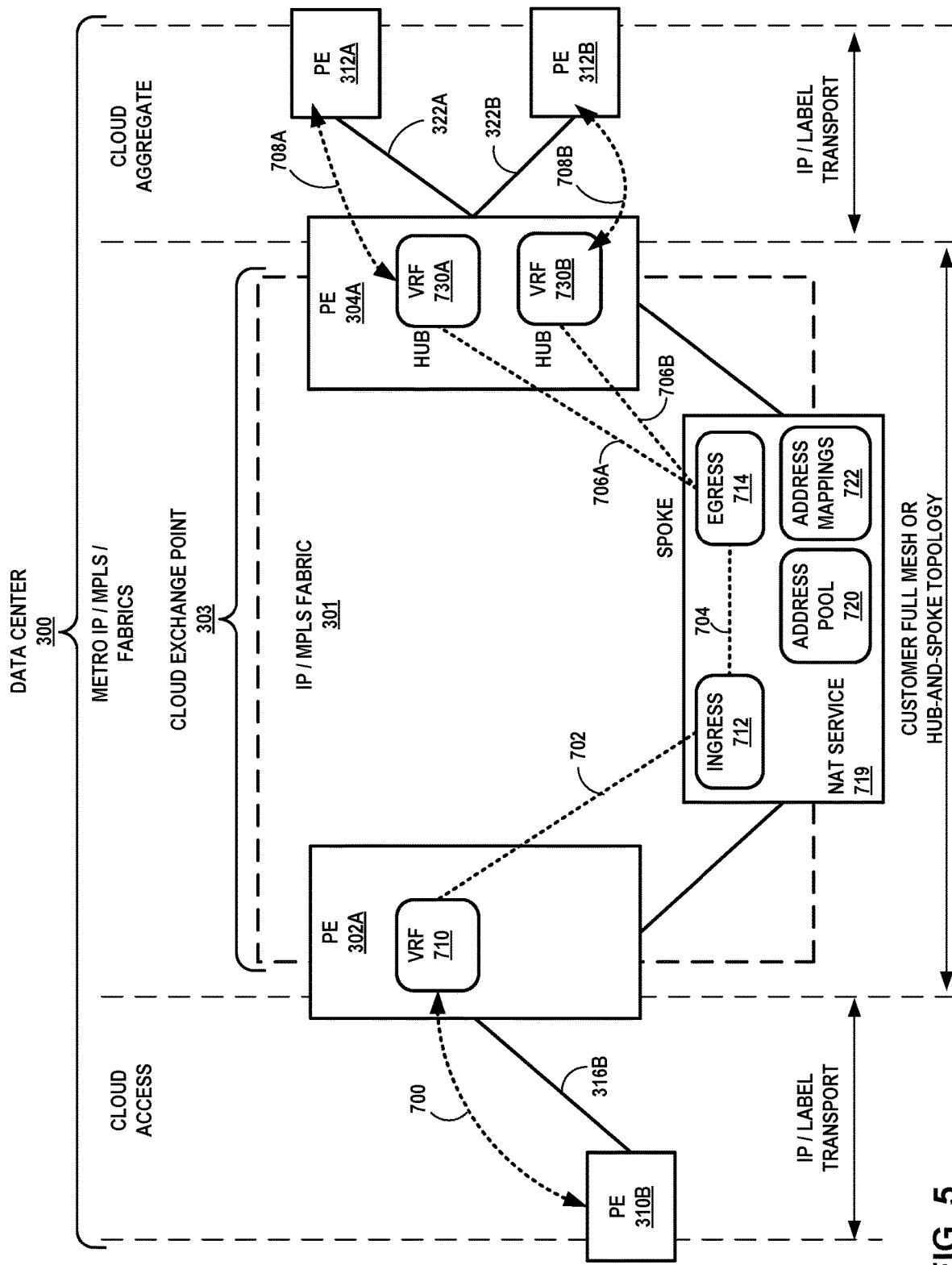
FIG. 5 is a block diagram illustrating an example of a data center-based cloud exchange point, according to techniques described herein.

FIG. 5 is a block diagram illustrating an example of a data center-based cloud exchange point, according to techniques described herein. Cloud service provider networks 320 and customer networks 308 are not shown in FIG. 5 for ease of illustration purposes. In these examples, the data center-based cloud exchange point 303 applies a network address translation (NAT) service 719 to, in part, enforce network address separation between the cloud service layer accessible via cloud aggregation links 322 and the cloud access layer accessible via cloud access links 316.

A cloud exchange point 303 NAT device(s) that applies NAT service 719 performs NAT (or NAPT), which may also or alternatively include carrier-grade NAT ("CG-NAT" or "CGN"), to translate the cloud exchange point 303 addresses and CSP routes and/or to translate the cloud exchange point 303 addresses and customer routes. The cloud exchange point 303 NAT device(s) that applies NAT service 719 (also referred to herein as "NAT service 719 device") may include one or more dedicated NAT appliances, one or more virtual machines executing on real server(s) and configured to apply NAT using network function virtualization (NFV), one or more service cards configured to apply the NAT service 719 and inserted in one or more of PEs 302, 304, or other device(s) inbox or out-of-box.

NAT service 719 of FIG. 5 may be implemented in one or more NAT service devices. In FIG. 5, the NAT service 719 is associated with an address pool 720 that is configured with routes for the cloud exchange point 303 autonomous system and from which the NAT service 719 may draw to automatically provision and map, for NAT purposes, to customer and/or cloud service provider routes received via peering sessions 700 and 708A-708B, respectively. The network addresses for configured routes in address pool 720 (or "NAT pool 720") may be public, private, or a combination thereof, and may represent IPv4 and/or IPv6 routes. In some examples, the network addresses are public in order to provide global uniqueness for the network addresses.

Address mappings 722 may specify one or more NAT mappings and/or network address and port translations (NAPT) that associate routes from address pool 720 for the cloud exchange point 303 with routes received by the cloud exchange point 303 routers from any of PEs 310, 312. Routes received from any of PEs 310, 312 for translation and used in end-to-end service delivery may include any IP addresses/prefixes from enterprise/NSP customers of the cloud exchange provider, such addresses including private and/or public IPv4 and/or IPv6 addresses and received at any one or more of the cloud exchange points managed by the cloud exchange provider.

As noted above, NAT service 719 may perform NAT to translate customer routes for customer network 308B (not shown in FIG. 5) and cloud exchange point 303 routes advertised to PEs 312A, 312B for aggregated cloud access. As a result, CSP networks 320 (not shown in FIG. 5) receive the cloud exchange point 303 routes drawn from address pool 720 instead of the customer routes. The cloud exchange point 303 is thus able to filter customer network information from the CSPs, and the CSPs receive cloud exchange point 303 routes associated with a single autonomous system (i.e., the cloud exchange point 303 and one ASN per cloud exchange point) rather than customer routes (which could potentially number in the millions) associated with multiple different autonomous systems (and corresponding ASNs, which could potentially number in the hundreds) for various customers (enterprises and/or NSPs).

Further, because the cloud exchange point 303 does not advertise its routes other than to customers and CSPs, the cloud exchange point 303 does not announce its routes to the Internet, which may improve security and reduce the potential for Denial of Service (DoS) or other malicious activity directed to the cloud exchange point 303 and customers/CSPs with which the cloud exchange point 303 has peering relationships. In addition, the techniques described above may simplify end-to-end cloud service delivery processing and improve performance by ensuring that local traffic is processed locally (within the cloud exchange point 303).

In the illustrated example, NAT service 719 is associated with ingress service VRF 712 ("ingress 712") and egress service VRF 714 ("egress 714") for attracting service traffic that is associated with customer network 308B and that is to be NATted. Ingress 712 and egress 714 constitute part of a customer service chain for cloud service traffic between customer network 308B and CSP networks 320A, 320B. Customer VRF 710 associated customer network 308B receives routes from customer PE 310B via peering session 700. Customer VRF 710 may be configured in a VPN-full mesh relationship with ingress service VRFs distributed in the cloud exchange point 303 (only one peering session 702 is illustrated, however).

In some examples, PE 302A distributes, for VRF 710, customer routes received via peering session 700 to the NAT service 719, which dynamically maps the customer route prefixes to cloud exchange point route prefixes drawn from address pool 720. The customer routes are installed to ingress service VRF 712. The NAT service 719 installs the mappings to address mappings 722 and installs, to egress service VRF 714, cloud exchange point routes that specify the cloud exchange point route prefixes and NAT service 719 as the next hop. In this way, NAT service 719 and more specifically egress service VRF 714 attracts downstream traffic from CSP network 320 that is intended for the customer network 308B but destined for the cloud exchange point routes installed to egress service VRF 714. Ingress service VRF 712 and egress service VRF 714 may establish peering session 704 and be configured with route targets to cause VRFs 712, 714 to leak routes to one another via iBGP, for instance.

Egress service VRF 714 may operate as a spoke VRF for corresponding hub VRFRs 730A, 730B in a manner similar to VRFs of PE 302A operating as spoke VRFs in the example of FIG. 4. That is, egress service VRF 714 and VRFs 730A, 730B are configured with reciprocal route targets such that egress service VRF 714 advertises routes for the egress service VRF 714 for installation to VRFs 730A, 730B, while VRFs 730A, 730B advertise routes for corresponding CSP networks 320A, 320B to egress service VRF 714. NATted upstream service traffic destined to any of CSP networks 320A, 320B passes through corresponding hub VRFs 730A, 730B. Each of peering sessions 706A, 706B may be used in this way to create hub-and-spoke VPNs for the respective CSP networks 320A, 320B.

PEs 302, 304 may establish tunnels with the NAT service 719 device. Routes exchanged via peering sessions 702 and 706A, 706B may include labeled routes for implementing MPLS/BGP IP-VPNs according to RFC 4364, incorporated above.

Cloud exchange point 303 may forward and apply NAT service 719 to downstream service traffic from PE 312A, intended for customer network 308A, as follows. PE 304A receives a service packet on aggregation link 322A. The packet has a destination address that is a cloud exchange point 303 address drawn from address pool 720. VRF 730A associated with aggregation link 322A stores a route for the destination address that specifies an address for the NAT service 719 device, and PE 304A tunnels the packet using VRF 730A to the NAT service 719 device for application of the NAT service.

NAT service 719 uses address mappings 722 dynamically provisioned for routes for customer network 308A and received from PE 302A to perform NAT and replace the service packet destination address with a destination address in customer network 308A. The NAT service 719 device may determine in ingress service VRF 712 the labeled route to PE 302A (the label identifying VRF 710) and tunnel the modified service packet PE 302A, which may identify VRF 710 from the label attached to the modified service packet. PE 302A forwards the modified service packet to PE 310 via access link 316B. In this way, cloud exchange point 303 provides a NAT service to the customer to separate the customer from the cloud service layer. In a similar way, the cloud exchange point 303 may apply NAT to upstream traffic to separate cloud service providers from the cloud or network access layer by which customer networks access the cloud exchange point.

FIG. 6A through FIG. 6F are conceptual diagrams illustrating example cryptographic operations performed within an example data center, in accordance with one or more aspects of the present disclosure. Each of FIG. 6A through FIG. 6F illustrate data center 601 of system 600. In each Figure, data center 601 includes cloud services exchange 200 (or "cloud exchange 200"). Cloud services exchange 200 communicates with any number of cloud service provider networks, including cloud service provider networks 110A through 110N (collectively "cloud service provider networks 110") over CSP ports 612 using a communication channel, which may be private communication channel such as a virtual circuit.

System 600 further includes customer networks 203A, 203B, through 203N (collectively "customer networks 203," which represent any number of customer networks), and network service provider (NSP) networks 204A, 204B, 204C, through 204N (collectively "NSP networks 204," which represent any number of NSP networks). Some of customer networks 203 may be included within or colocated within data center 601, and other customer networks 203 may be located outside of data center 601 but may access data center 601 through an external connection or through one or more NSP networks 204. Similarly, some of NSP networks 204 may be included within or colocated within data center 601 (e.g., NSP network 204A), and other NSP networks 204 may be located outside of data center 601 (e.g., NSP network 204B) but may access or communicate with data center 601 through an external connection. Each of customer networks 203 and/or NSP networks 204 may communicate with cloud services exchange 200 through customer ports 610 using a communication channel, which may be private communication channel such as a virtual circuit.

One or more customer computing devices 108, such as customer computing devices 108A, 108B, 108C, through 108N (collectively "customer computing devices 108") may each be operated by cloud customers and may receive services on behalf of or for the benefit of such customers from cloud services exchange 200, data center 601, and/or cloud service provider networks 110. In some examples, each of customer computing devices 108 may access services of cloud services exchange 200 through a service interface or API (not shown in FIG. 6A through FIG. 6F) that may be integrated into a programmable network platform (also not shown in FIG. 6A through FIG. 6F). Such a services interface may be similar to service interface 114 of FIG. 1 and/or FIG. 2. A programmable network platform implemented within FIG. 6A through FIG. 6F may correspond to or be similar to programmable network platform 120 of FIG. 1 and/or FIG. 2.

In the illustrations of FIG. 6A through FIG. 6F, customer network 203A and customer computing device 108A are considered to be associated with the same customer (e.g., "customer A"), and customer network 203B and customer computing device 108B are likewise assumed to be associated with the same customer (e.g., "customer B"). A similar convention applies to other customer networks 203 and customer computing devices 108 illustrated in FIG. 6B through FIG. 6F for any number of N customers.

As with cloud exchange 100 of FIG. 1, cloud services exchange 200 may provide customers of the exchange (e.g., enterprises, network carriers, network service providers, and SaaS customers), with secure, private, virtual connections to multiple cloud service providers (CSPs) globally. Each of cloud service provider networks 110 may participate in the cloud exchange by virtue of their having at least one accessible port in the cloud exchange by which one or more customer computing devices 108, customer networks 203, and/or NSP networks 204 can connect to the one or more cloud services offered by cloud service provider networks 110, e.g., using a virtual circuit provided by the cloud services exchange 200. Cloud services exchange 200 may allow private networks of customers to be directly cross-connected to other customers at a common point, thereby allowing direct exchange of network traffic between the networks of the customers.

Cloud services exchange 200 includes network infrastructure 222 and one or more computing systems 150. Network infrastructure 222 may correspond to network infrastructure 222 of FIG. 2 and may provide a L2/L3 switching fabric by which cloud service provider networks 110 and customers/ NSPs interconnect, thereby enabling an NSP/customer to have options to create many-to-many interconnections with a one-time hook up to the switching network and underlying network infrastructure 222 that presents an interconnection platform for cloud exchange 200. Cloud exchange 200 may thereby allow customers to interconnect to multiple cloud service provider networks 110 and cloud services using network infrastructure 222 within data center 601. Computing system 150 may correspond to computing system 150 of FIG. 1 and may provide access to one or more hardware security modules 151 for the purpose of providing cryptographic services, such as storage, creation, use, or other operations relating to one or more cryptographic keys 631 (including, e.g., cryptographic key 631A) stored within one or more hardware security modules 151. The cloud exchange 200 provider may also provision and manage computing system 150 of the cloud exchange 200. As used herein, operations attributed to cloud exchange 200 may include operations of computing system 150 of the cloud exchange 200.

For ease of illustration, only a limited number of cloud service provider networks 110, data centers 601, cloud services exchanges 200, hardware security modules 151, customer networks 203, NSP networks 204, customer computing devices 108, and other components or devices are shown within FIG. 6A through FIG. 6F and/or in other illustrations referenced herein. However, techniques in accordance with one or more aspects of the present disclosure may be performed with many more of such systems, and collective references to components, devices, modules, and/or systems may represent any number of such components, devices, modules, and/or systems.

Figure 6A:
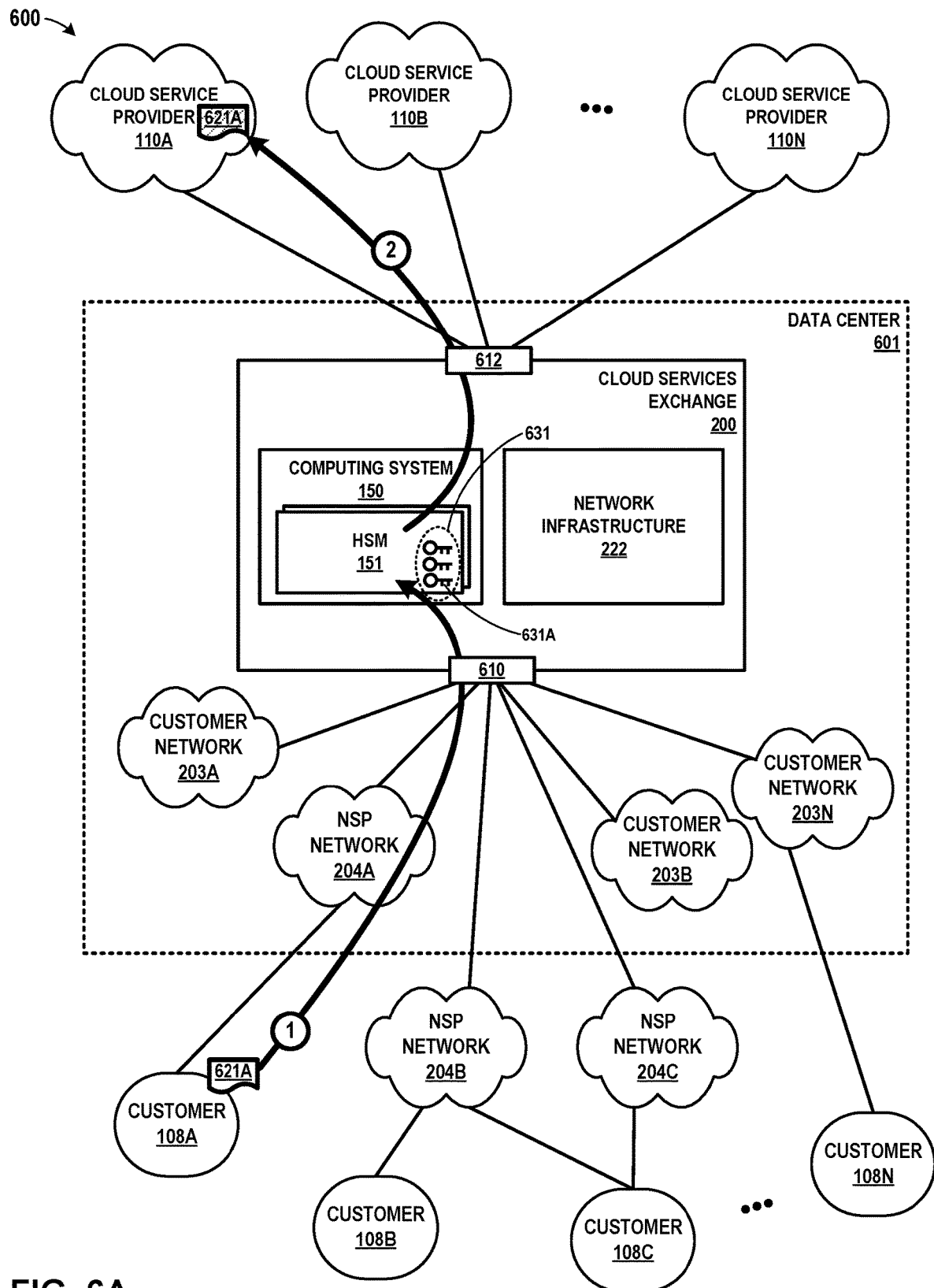
FIG. 6A through FIG. 6F are conceptual diagrams illustrating example cryptographic operations performed within an example data center, in accordance with one or more aspects of the present disclosure.

In FIG. 6A, and in accordance with one or more aspects of the present disclosure, cloud services exchange 200 may encrypt data at the direction of an authenticated user of customer computing device 108A. In an example that can be described with reference to FIG. 6A, cloud services exchange 200A may authenticate a user of customer computing device 108A. For instance, in such an example, customer computing device 108A outputs a signal over NSP network 204A. NSP network 204A communicates information about the signal over customer ports 610, and the information about the signals is presented to a service interface of cloud services exchange 200. Computing system 150 of cloud services exchange 200 determines that the signals include authentication credentials for a user of 108A. Computing system 150 evaluates the authentication credentials and determines that the user of customer computing device 108A is authorized to access some or all services provided by cloud services exchange 200.

Cloud services exchange 200 may encrypt data 621A received from customer computing device 108A. For instance, in the example of FIG. 6A, customer computing device 108A outputs one or more signals over NSP network 204A (see, e.g., reference arrow "1" in FIG. 6A). NSP network 204A communicates information about the signals over customer ports 610 to cloud services exchange 200 (e.g., through a service interface or API). Computing system 150 within cloud services exchange 200 determines that the signals include data 621A. Computing system 150 further determines that the signals correspond to a request, by an authenticated user of customer computing device 108A, to create an encryption key, encrypt data 621A, and store encrypted data 621A. Computing system 150 causes one or more hardware security modules 151 to generate cryptographic key 631A and associate cryptographic key 631A with a name or identifier specified by a user of customer computing device 108A. Hardware security module 151 stores cryptographic key 631A securely within hardware included within hardware security module 151, and cryptographic operations involving cryptographic key 631A can thereafter be performed within hardware security module 151 by an authorized user specifying the name or identifier. Computing system 150 causes one or more hardware security modules 151 to encrypt data 621A using cryptographic key 631A, thereby producing encrypted data 621A.

Cloud services exchange 200 may store encrypted data 621A at one or more storage devices within system 600. For instance, computing system 150 provides cloud services exchange 200 with access to encrypted data 621A. Cloud services exchange 200 outputs, over CSP ports 612, encrypted data 621A to one or more of cloud service provider networks 110 for storage within one or more of cloud service provider networks 110, without providing any of cloud service provider networks 110 access to cryptographic key 631A (see reference arrow "2"). In the example shown in FIG. 6A, cloud services exchange 200 outputs encrypted data 621A to cloud service provider network 110A for storage within cloud service provider network 110A. In other examples, encrypted data 621A may be stored elsewhere within system 600. For example, cloud services exchange 200 may, alternatively or in addition, output encrypted data 621A to customer network 203A within system 600, and one or more devices within customer network 203A may store encrypted data 621A, again without providing any device within customer network 203A access to cryptographic key 631A. Alternatively or in addition, cloud services exchange 200 may output encrypted data 621A over NSP network 204A for storage within customer computing device 108A, also without providing customer computing device 108A or any user of customer computing device 108A with access to cryptographic key 631A. Still further, cloud services exchange 200 may store encrypted data 621A at another device within system 600.

Thereafter, one or more devices within system 600 may access encrypted data 621A making an appropriate request for the data from cloud services exchange 200. For instance, in one example, and as further described in connection with FIG. 6D through FIG. 6F, customer computing device 108A may access data 621A by authenticating with cloud services exchange 200 (and/or one or more of cloud service provider networks 110), and requesting access to data 621A. In response to an appropriate request from customer computing device 108A, cloud services exchange 200 retrieves data 621A from storage (e.g., one or more of cloud service provider networks 110, customer network 203A, or elsewhere). Computing system 150 causes hardware security module 151 to decrypt data 621C within hardware security module 151 using cryptographic key 631A. Computing system 150 then outputs unencrypted (e.g., "plain text") data 621A (through a secure communication channel) to customer computing device 108A.

Computing system 150 may similarly encrypt data received from one or more other customer computing devices 108. In such an example, computing system 150 may cause one or more hardware security modules 151 to encrypt data and store the encrypted data at a specified location (e.g., within one or more of cloud service provider networks 110, within data center 601, or at another location). Accordingly, computing system 150 may provide cryptographic services, using hardware security modules 151, to multiple customers, and enable storage at such data at multiple locations, including any of cloud service provider networks 110.

Figure 6B:
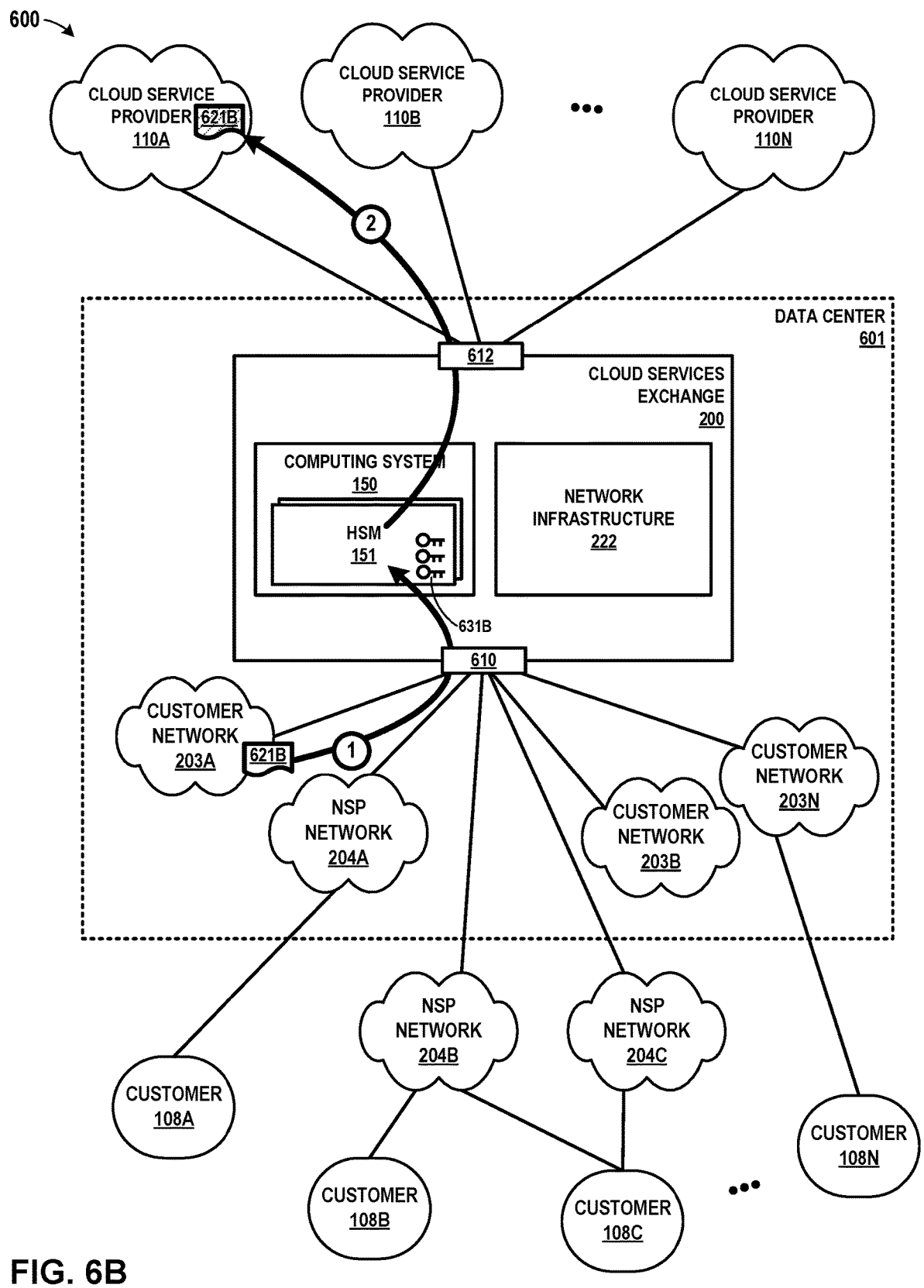

FIG. 6B illustrates an example operation in which cloud services exchange 200 may encrypt data received from customer network 203A. For instance, in the example of FIG. 6B, customer computing device 108A outputs one or more signals over NSP network 204A, and NSP network 204A communicates information about the signals to cloud services exchange 200 over customer ports 610. Cloud services exchange 200 determines that the signals correspond to a request to access data 621B stored within customer network 203A. Cloud services exchange 200 further determines that the signals include a request to encrypt data 621B using cryptographic key 631B, and store encrypted data 621B.

Cloud services exchange 200 outputs one or more signals to customer network 203A. Responsive to the signals, one or more computing devices within customer network 203A generates and/or accesses data 621B. One or more devices within customer network 203A output one or more signals from customer network 203A to cloud services exchange 200 over customer ports 610 (reference arrow 1 in FIG. 6B). Cloud services exchange 200 receives a signal and communicates information about the signal to computing system 150. Computing system 150 determines that the signal includes data 621B, generated by and/or accessed within customer network 203A. In the example of FIG. 6B, cryptographic key 631B is stored within one or more hardware security modules 151, possibly as a result of a previous encryption key generation operation. Computing system 150 causes one or more of hardware security modules 151 to access cryptographic key 631B and encrypt data 621B using cryptographic key 631B.

As in the earlier example, cloud services exchange 200 may store encrypted data 621B at one or more storage devices within system 600. For instance, in the example of FIG. 6B, computing system 150 provides cloud services exchange 200 with access to encrypted data 621B. Cloud services exchange 200 outputs, over CSP ports 612, encrypted data 621B to cloud service provider network 110A for storage within one or more devices included within cloud service provider network 110A (reference arrow 2). Although in the example of FIG. 6B cloud services exchange 200 stores encrypted data 621B within cloud service provider network 110A, cloud services exchange 200 may alternatively, or in addition, store encrypted data 621B within one or more other cloud service provider networks 110, within devices included within customer network 203A, or within other devices within system 600.

Figure 6C:
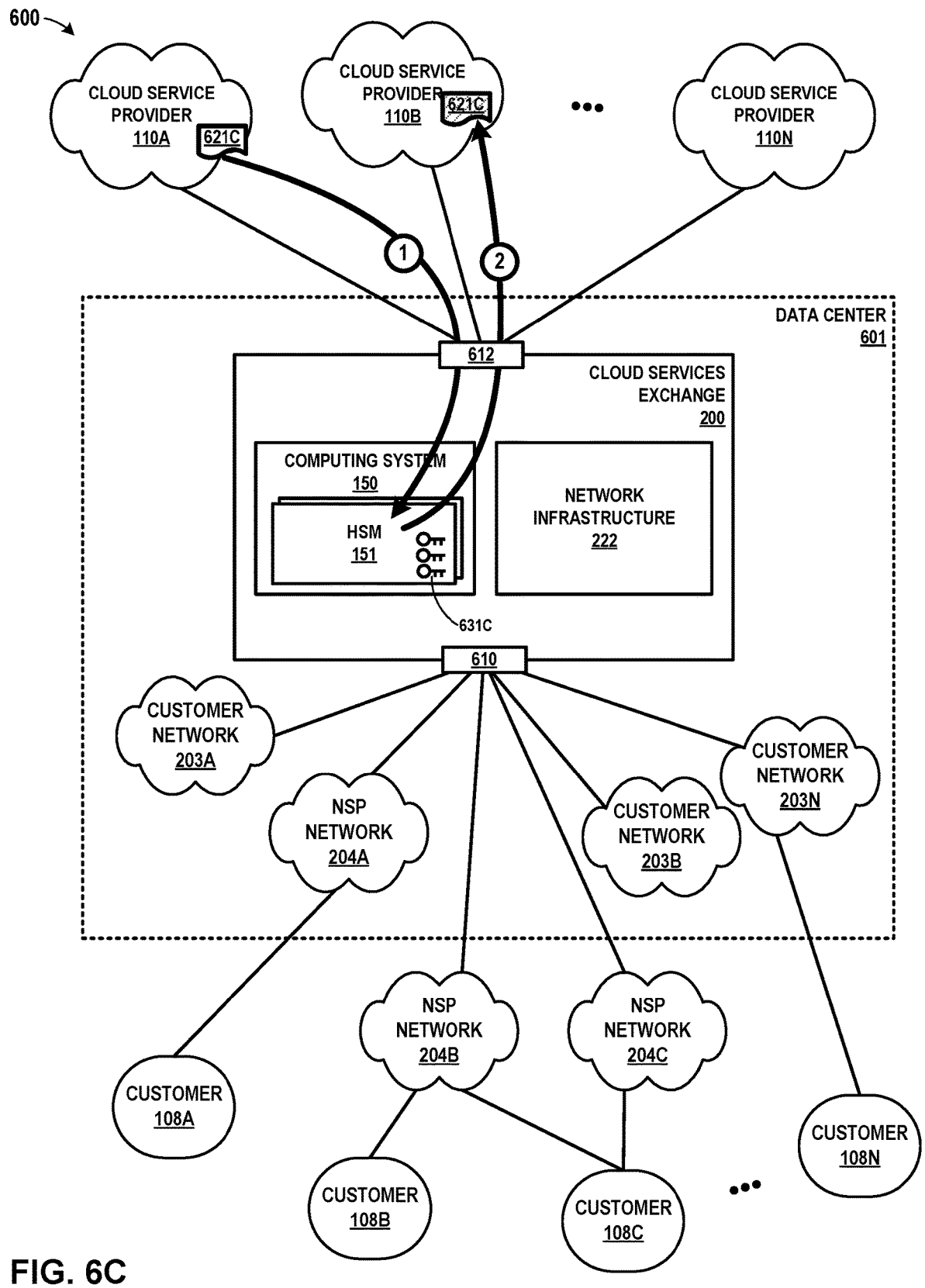

FIG. 6C illustrates an example operation in which cloud services exchange 200 may encrypt data received from cloud service provider network 110A. For instance, in the example of FIG. 6C, customer computing device 108A outputs one or more signals over NSP network 204A, and information about the signals are communicated to cloud services exchange 200 over customer ports 610. Computing system 150 within cloud services exchange 200 determines that the signals include a request to access data 621C within cloud service provider network 110A, encrypt data 621C using cryptographic key 631C, and store encrypted data 621C within a different one of cloud service provider networks 110 (e.g., any of cloud service provider networks 110B through 110N). In response to such a determination, computing system 150 outputs one or more signals to cloud service provider network 110A. Responsive to the signals, one or more computing devices within cloud service provider network 110A generates and/or accesses data 621C at one or more devices within cloud service provider network 110A. One or more devices within cloud service provider network 110A output one or more signals from cloud service provider network 110A to cloud services exchange 200 over CSP ports 612 (reference arrow 1). Cloud services exchange 200 receives one or more signals and communicates information about the signal to computing system 150. Computing system 150 determines that the signals include data 621C.

In the example described in connection with FIG. 6C, computing system 150 within cloud services exchange 200 determines that the signals received over customer ports 610 include a request to access data 621C within cloud service provider network 110A. In other examples, computing system 150 within cloud services exchange 200 might receive a request to access data 621C within cloud service provider network 110A, but not over ports 610. For instance, computing system 150 might receive such a command from a different source. Such a source may include a device within cloud services exchange 200 or an external device (not connected over ports 610). In other examples, computing system 150 within cloud services exchange 200 might access data 621C within cloud service provider network 110A, based on other circumstances, including an internally generated command. Accordingly, operations described herein might not, in some examples, be prompted by input received over ports 610.

In some examples, data 621C may be unencrypted data generated by a process executed within cloud service provider network 110A or received from another device by a system included within cloud service provider network 110A. Computing system 150 causes one or more hardware security modules 151 to access cryptographic key 631C within hardware security module 151 and encrypt data 621C using cryptographic key 631C.

Cloud services exchange 200 may store encrypted data 621C at one or more cloud service provider networks 110. For instance, in the example of FIG. 6C, computing system 150 receives encrypted data 621C from hardware security module 151 and outputs encrypted data 621C to cloud service provider network 110B over CSP ports 612, without providing cloud service provider network 110B access to cryptographic key 631C (arrow 2). One or more devices within cloud service provider network 110B store encrypted data 621C. In other examples, computing system 150 may also store encrypted data 621C at one or more other cloud service provider networks 110, or within another device (e.g., within customer network 203A, within customer computing device 108A, or elsewhere within system 600).

Figure 6D:
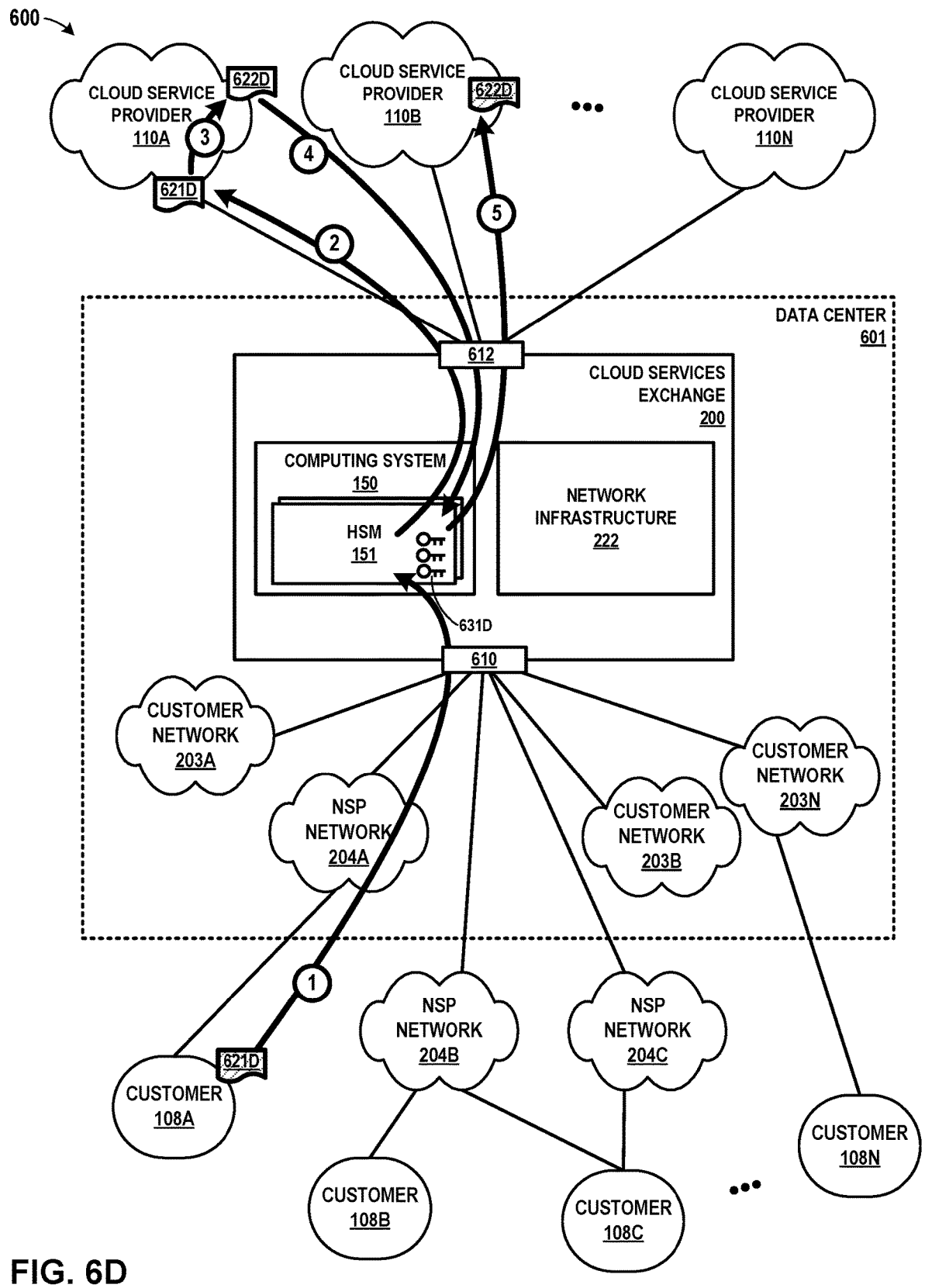

FIG. 6D illustrates an example operation in which cloud services exchange 200 decrypts data received from customer computing device 108A. For instance, in the example of FIG. 6D, customer computing device 108A outputs one or more signals over NSP network 204A (arrow 1). NSP network 204A communicates information about the signals to cloud services exchange 200 over customer ports 610. Computing system 150 of cloud services exchange 200 determines that the signals include encrypted data 621D. Computing system 150 further determines that the signals correspond to a request, by an authenticated user of customer computing device 108A, to decrypt data 621D using cryptographic key 631D and perform processing on unencrypted or unencrypted data 621D. In some examples, cryptographic key 631D is identified by a user of customer computing device 108A through a name or identifier that hardware security module 151 associates with cryptographic key 631D. Computing system 150 causes one or more of hardware security modules 151 to decrypt data 621D using cryptographic key 631D, thereby producing unencrypted data 621D.

Cloud services exchange 200 may output unencrypted data 621D to one or more devices for processing. For instance, in one example, computing system 150 provides cloud services exchange 200 with access to unencrypted data 621D. Cloud services exchange 200 outputs unencrypted data 621D to one or more of cloud service provider networks 110 for processing. In the example of FIG. 6D, cloud services exchange 200 outputs unencrypted data 621D over CSP ports 612 (e.g., through a secure channel) to cloud service provider network 110A (arrow 2). One or more devices within cloud service provider network 110A perform the requested processing on data 621D, and generate processing results data 622D (arrow 3). Cloud service provider network 110A may store processing results data 622D within one or more devices included within cloud service provider network 110A.

Cloud services exchange 200 may store encrypted data within one or more other cloud service provider networks 110. For instance, still referring to FIG. 6D, cloud service provider network 110A outputs processing results data 622D to cloud services exchange 200 over CSP ports 612 (arrow 4). Computing system 150 of cloud services exchange 200 causes hardware security module 151 to encrypt processing results data 622D using cryptographic key 631D (or another cryptographic key). Cloud services exchange 200 outputs one or more signals over CSP ports 612 to cloud service provider network 110B (arrow 5). One or more devices within cloud service provider network 110B detect a signal, determine that the signal includes data for storage, and store processing results data 622D.

Figure 6E:
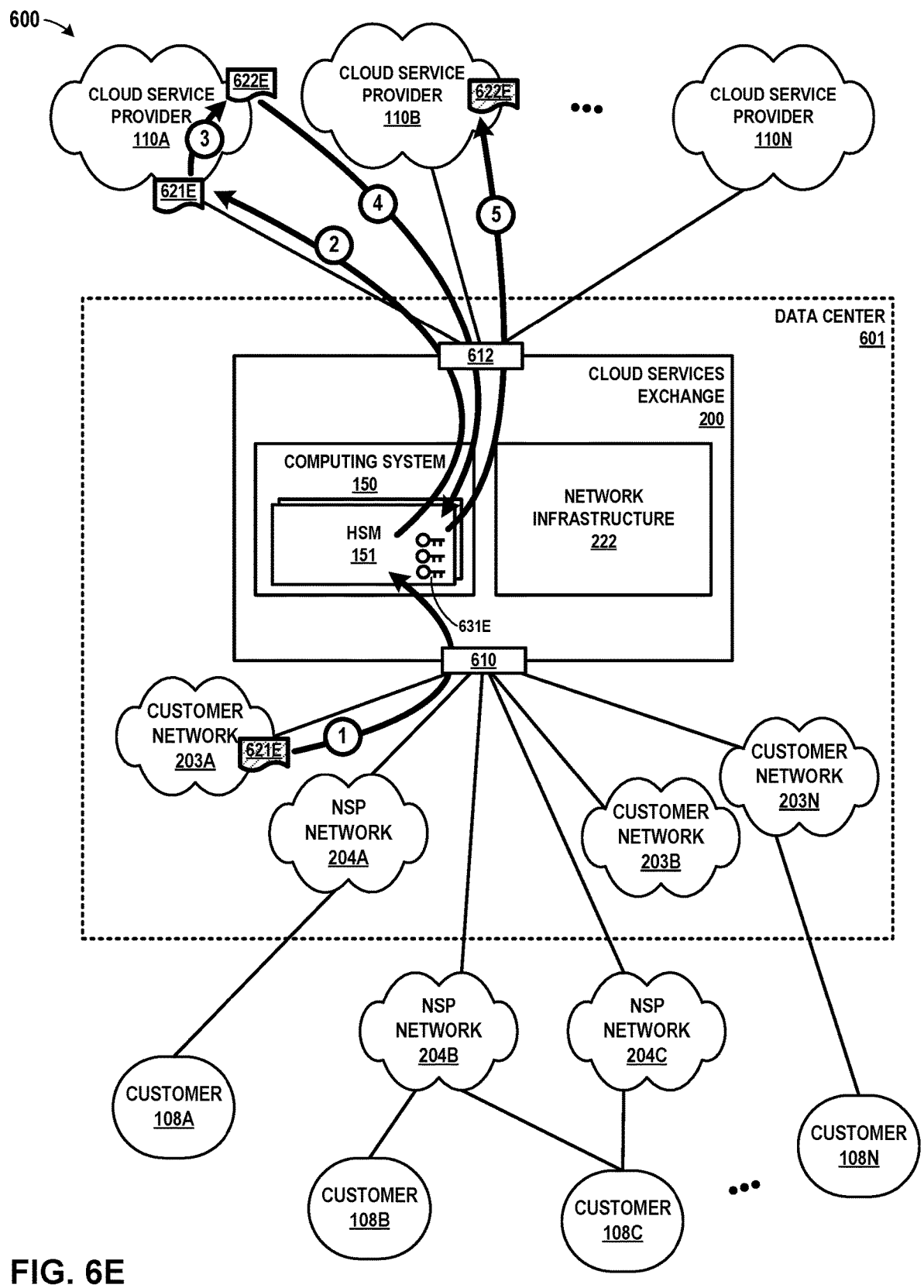

FIG. 6E illustrates an example operation in which cloud services exchange 200 decrypts data received from customer network 203A. For instance, in the example of FIG. 6E, customer computing device 108A outputs one or more signals over NSP network 204A, and NSP network 204A communicates information about eh signals to cloud services exchange 200 over customer ports 610. Computing system 150 of cloud services exchange 200 determines that the signals correspond to a request, by an authenticated user of customer computing device 108A, to access data 621E, decrypt data 621E using cryptographic key 631D, and perform processing on unencrypted data 621E. Computing system 150 further determines that data 621E is stored within customer network 203A. Computing system 150 outputs a signal over customer ports 610 to customer network 203A. One or more devices within customer network 203A detect a signal and respond by outputting encrypted data 621E to cloud services exchange 200 over customer ports 610 (arrow 1). Computing system 150 of cloud services exchange 200 causes hardware security module 151 to decrypt data 621E using cryptographic key 631E, thereby producing unencrypted data 621E.

Cloud services exchange 200 may output unencrypted data 621E to one or more devices for processing. For instance, in the example of FIG. 6E, computing system 150 provides cloud services exchange 200 with access to unencrypted data 621E. Cloud services exchange 200 outputs unencrypted data 621E over CSP ports 612 (e.g., through a secure channel) to cloud service provider network 110A (arrow 2). One or more devices within cloud service provider network 110A perform the requested processing on data 621E, and generate processing results data 622E (arrow 3). Cloud service provider network 110A may store processing results data 622E within one or more devices included within cloud service provider network 110A.

Cloud services exchange 200 may store encrypted data within one or more other cloud service provider networks 110. For instance, still referring to FIG. 6E, cloud service provider network 110A outputs processing results data 622E to cloud services exchange 200 over CSP ports 612 (arrow 4). Computing system 150 of cloud services exchange 200 causes hardware security module 151 to encrypt processing results data 622E using cryptographic key 631E or another key specified by the user of customer computing device 108A. Cloud services exchange 200 outputs one or more signals over CSP ports 612 to cloud service provider network 110B (arrow 5). One or more devices within cloud service provider network 110B detect a signal, determine that the signal includes processing results data for storage. One or more devices within cloud service provider network 110B store encrypted processing results data 622E.

In the examples of FIG. 6D and FIG. 6E, data is processed within cloud service provider network 110A to generate processing results data, and that processing results data is stored within cloud service provider network 110B. In other examples, data may be processed elsewhere, such as in any of the other cloud service provider networks 110 or within one or more customer networks 203. Similarly, processing results data may be stored elsewhere, such as within any of the other cloud service provider networks 110, within one or more customer networks 203, or elsewhere.

Figure 6F:
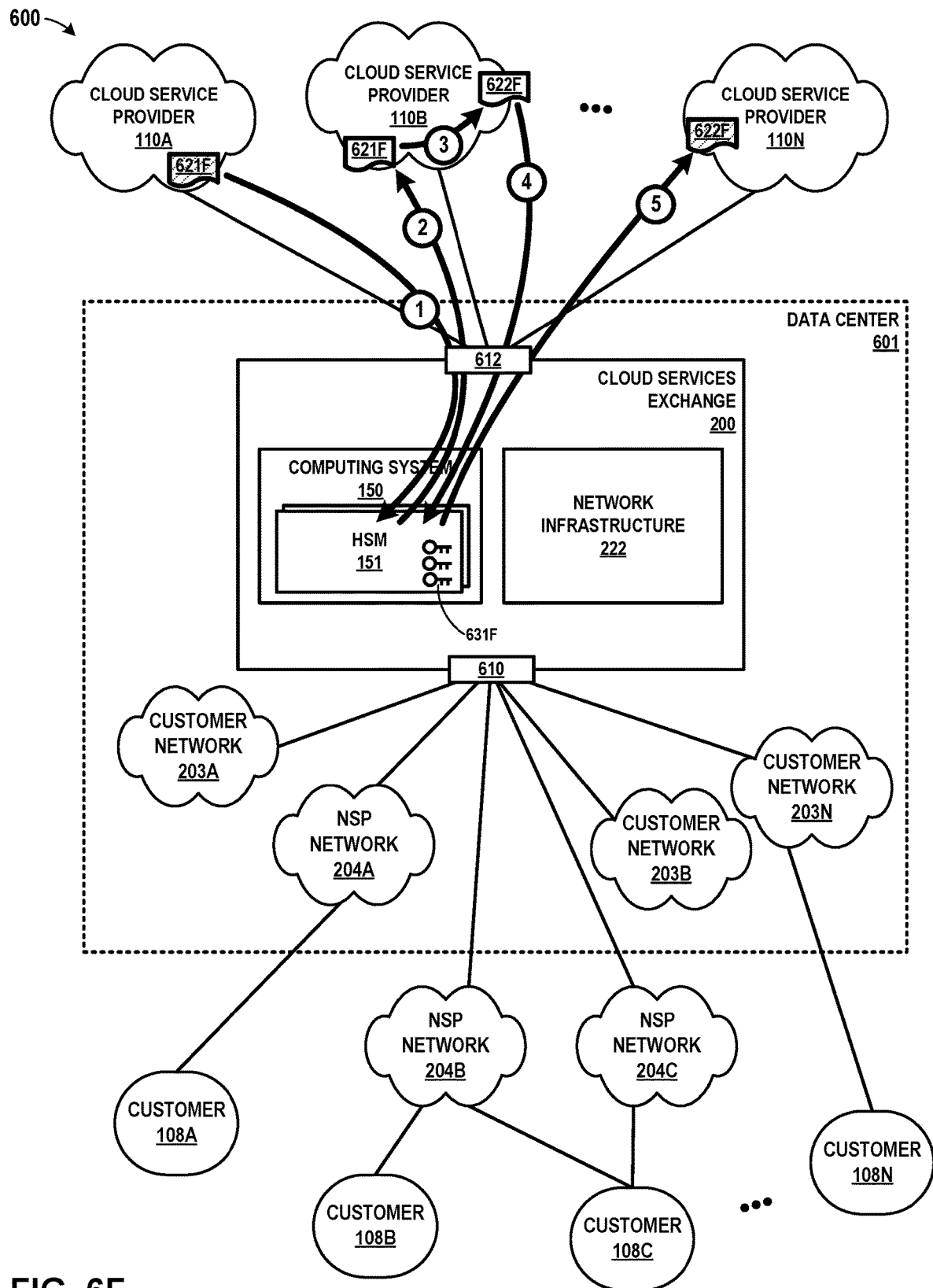

FIG. 6F illustrates an example operation in which cloud services exchange 200 decrypts data accessed from cloud service provider network 110A. For instance, in the example of FIG. 6F, customer computing device 108A outputs one or more signals over NSP network 204A, and information about the signals is received by cloud services exchange 200 over customer ports 610. Computing system 150 of cloud services exchange 200 determines that the signals correspond to a request, by an authenticated user of customer computing device 108A, to access data 621F within cloud service provider network 110A, decrypt data 621F using a specific cryptographic key, and perform processing on unencrypted data 621F. Computing system 150 outputs a signal over customer ports 610 to cloud service provider network 110A. One or more devices within cloud service provider network 110A detect a signal and respond by outputting encrypted data 621F to cloud services exchange 200 over CSP ports 612 (arrow 1). Computing system 150 of cloud services exchange 200 causes hardware security module 151 to decrypt data 621F using cryptographic key 631F, thereby producing unencrypted data 621F.

Cloud services exchange 200 may output unencrypted data 621F to one or more devices for processing. For instance, in the example of FIG. 6F, computing system 150 provides cloud services exchange 200 with access to unencrypted data 621F. Cloud services exchange 200 outputs unencrypted data 621F over CSP ports 612 (e.g., through a secure channel) to cloud service provider network 110B (arrow 2). One or more devices within cloud service provider network 110B perform the requested processing on data 621F, and generate processing results data 622F (arrow 3).

Cloud services exchange 200 may store encrypted data within one or more cloud service provider networks 110. For instance, still referring to FIG. 6F, cloud service provider network 110B outputs processing results data 622F to cloud services exchange 200 over CSP ports 612 (arrow 4). Computing system 150 of cloud services exchange 200 causes hardware security module 151 to encrypt processing results data 622F using cryptographic key 631F or another cryptographic key. Cloud services exchange 200 outputs one or more signals over CSP ports 612 to cloud service provider network 110N (arrow 5). One or more devices within cloud service provider network 110N detect a signal, determine that the signal includes processing results data 622F, and store processing results data 622F.

Figure 7:
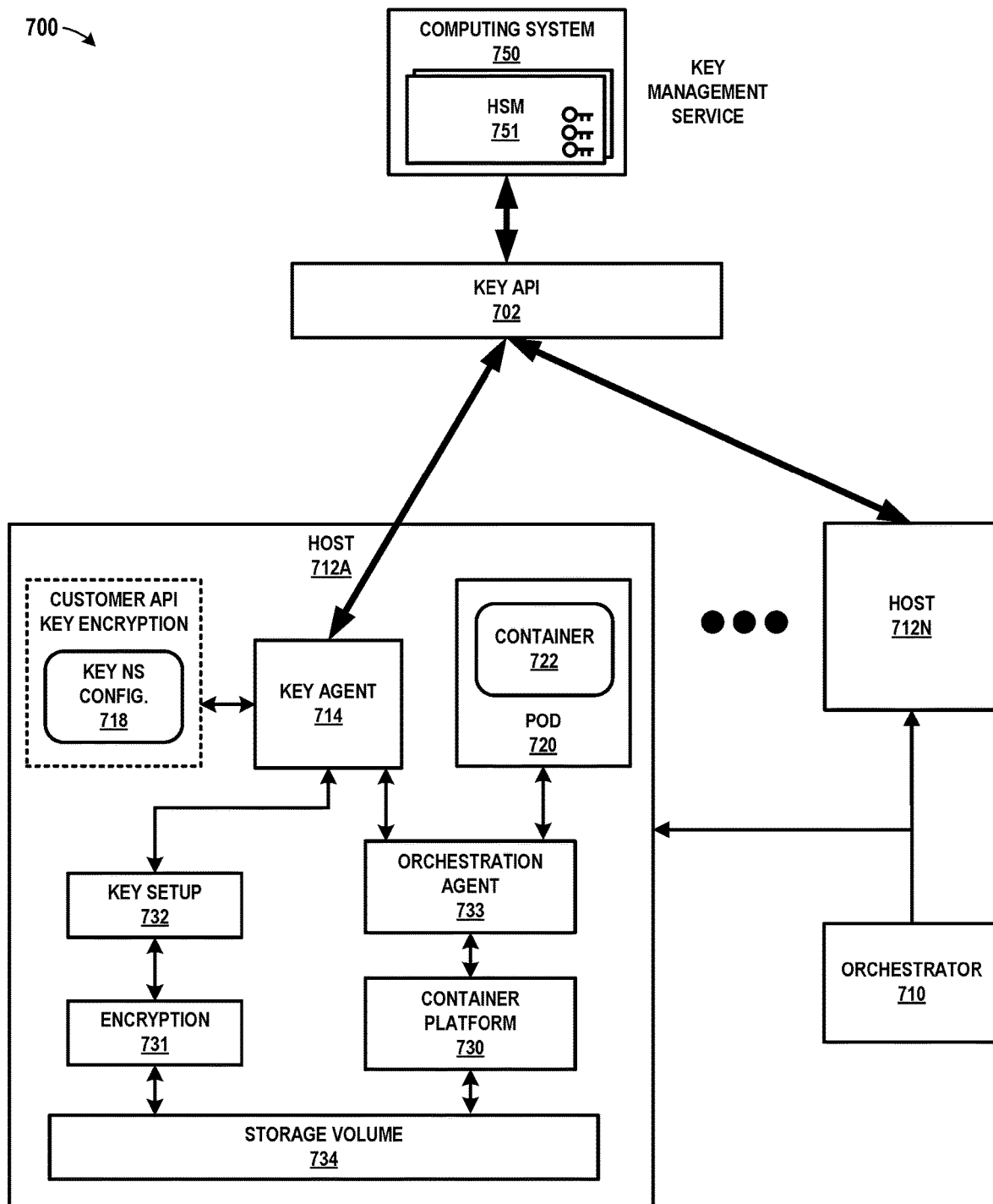
FIG. 7 is a block diagram illustrating an example system with example components for interconnecting containerized workloads to a key management system, in accordance with one or more aspects of the present disclosure.

FIG. 7 is a block diagram illustrating an example system with example components for interconnecting containerized workloads to a key management system, in accordance with one or more aspects of the present disclosure. Computing system 700 includes a computing system 750 offering a key management service, which is accessible through a key API 702. Computing system 750 having hardware security module 751 may in some respects be similar to computing system 150 having hardware security module 151, described above. However, in accordance with techniques of these aspects of the disclosure, computing system 750 may read and provide, responsive to requests, encryption keys securely stored by hardware security module 751 to hosts 712 for use in encrypting/decrypting data for containers, as part of a key management service.

System 700 also include a host computing devices 712A-712N, which may represent real and/or virtual servers executing components similar to those depicted in further detail with respect to computing device 712A. Computing devices 712 may be devices for a cloud computing environment, such as a public, private, or hybrid cloud, and participate in offering cloud services to customers. Computing devices 712 may be devices for an enterprise computing environment, such as any of the aforementioned customer networks.

Applications may run in various forms, including regular processes executed natively from standard binaries, executed by virtual machines (VMs), or deployed and executed in containerized form. A virtualized container, such as provided by the open-source Docker Container application, is more lightweight than a VM and more likely to migrate from one computing environment to another. Like a VM, each container is virtualized and may remain isolated from the host machine and other containers. However, unlike a VM, each container may omit an individual operating system and provide only an application suite and application-specific libraries. Each container is executed by the host machine as an isolated user-space instance and may share an operating system and common libraries with other containers executing on the host machine. Thus, a cloud computing environment using containers may require much less processing power, storage, and network resources than a cloud computing environment implementing VMs. As used herein, containers may also be referred to as virtualization engines, virtual private servers, silos, or jails. In some instances, the techniques described herein with respect to container may be applied to virtual machines or other virtualization components.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine. Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker.com/engine/understanding-docker, last accessed Jul. 9, 2016; and in Aaron Grattafiori, "Understanding and Hardening Linux Containers," NCC Group, Apr. 20, 2016; each of which are incorporated by reference herein in their entireties.

Thus, containerized applications differ from regular applications in that the containerized applications run as one or more containers on a Linux operating system. Any changes to the application may be done by creating a new container from an updated application binary. In general, containerized applications use encryption as a form of security to protect data. In some cases, a local or remote storage volume for a container may be encrypted and must be "unlocked" in order for the container to read data stored by the storage volume in unencrypted form and for the container to storage data in encrypted form to the storage volume. In some cases, the data include the container itself. In some cases, the data is merely read/written by the container. Thus, data for use with the container includes, e.g., data used by the container and the container. A container may be deployed or otherwise associated with a particular customer or tenant of a cloud or enterprise.

Data encryption keys (DEKs) for a container may be stored on a key management server, such as computing system. In some examples, computing system 750 may provide key management services, enabling customers control over the encryption keys they create and that are used to protect data associated with each customer. In some examples, such key management services provided by computing system 750 may enable customers to access an API 702 to, for example, organize or manage what specific named keys can be used to encrypt or decrypt specific data. Further, such services may be used to create, import, rotate, disable, and/or delete cryptographic keys and/or other key material. In some examples, computing system 750 may also enable customers to define usage policies for cryptographic material and/or audit the use of cryptographic or encryption keys. API 702 may be provided by an API gateway or other computing system (not shown) or by computing system 750.

Computing system 700 implements an automation platform for automating deployment, scaling, and operations of virtual execution elements across host computing devices to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform.

In general, orchestrator 710 is an orchestrator for an orchestration platform and controls the deployment, scaling, and operations of containers across host computing devices 712. Orchestrator 710 may implement respective cluster masters for one or more Kubernetes clusters. As an example, Kubernetes is a container management platform that provides portability across public and private clouds, each of which may provide virtualization infrastructure to the container management platform. Example instances of orchestration platforms include Kubernetes, OpenShift, Docker swarm, OpenStack, Mesos/Marathon, VMware, and Amazon ECS.

Host computing device 712A includes a container platform 730 for running containerized applications, such as those of pod 720. Container platform 730 receives requests from orchestrator 710 to obtain and host containers in computing device 712A. Container platform 730 obtains and executes the containers.

In one example, pod 720 is a Kubernetes pod. A pod is a group of one or more logically-related containers, the shared storage for the containers, and options on how to run the containers. Where instantiated for execution, a pod may alternatively be referred to as a "pod replica."

Orchestration agent 733 may represent a kubelet for a minion node of a Kubernetes cluster. Orchestration agent 733 is an agent of orchestrator 710, which receives container specification data for containers and ensures the containers execute by computing device 712A. Container specification data may be in the form of a manifest file sent to orchestration agent 733 from orchestrator 710 or indirectly received via a command line interface, HTTP endpoint, or HTTP server. Container specification data may be a pod specification (e.g., a PodSpec—a YAML (Yet Another Markup Language) or JSON object that describes a pod) for pod 720. Based on the container specification data, orchestration agent 733 directs container platform 730 to obtain and instantiate the container images for container 722, for instance, for execution of container 722 by computing device 712A.

Non-containerized applications may be developed to communicate with a key management server and obtain an encryption key before accessing the data. However, in containerized form, applications execute for a short amount of time and also are frequently migrated from one host computing device to another. This poses challenges specifically in associating an encryption key with an application.

In accordance with techniques described in this disclosure, a user (directly or via computing system 750) configures an encryption key namespace with key namespace configuration 718 that stores an association of a key identifier and a container identifier for container 722. Conventional containers are built on top of process, file system, and Interprocess communication (IPC) namespaces. For example, storage volume 734 may be a namespace for container 722. A namespace, such as a Linux namespace, wraps a global system resource in an abstraction that makes it appear to the processes within the namespace that they have their own isolated instance of the global resource. Changes to the global resource are visible to other processes that are members of the namespace but are invisible to other processes. One use of namespaces is to implement containers.

The encryption key namespace is a parallel, separate namespace used for managing encryption keys used by containers. The encryption key namespace may then use a logging mechanism for bookkeeping for the containers. This may allow associating an encryption key to a container. The encryption key namespace may be an independent component on the host computing device 712A and may be stored to local storage or the host computing device 712A. In some cases, when container 722 is loaded to memory and makes use of other namespaces for host computing device 712A, the encryption key namespace is likewise loaded to memory and key namespace configuration 718 can be read.

In some cases, the encryption key namespace effectively divides the "key space" to present different keys to different containers. In such cases, each container sees only its own key in key namespace configuration 718.

Key namespace configuration 718 stores key identifiers in association with a container identifier for a container. The container identifier may be a container image identifier and may be a hash value of the contents of the container's entire file system, thus ensuring a unique container identifier. This may improve the likelihood, and in some cases, guarantee that a container can be identified uniquely across multiple environments. However, other ways to generate container identifiers are possible.

Key agent 714 is a small application or kernel utility, for instance, that obtains the encryption key for container 722 and feeds it to key setup 732. Key agent 714 may be, for example, a Kubernetes customer resource or a Docker plugin. When directed by orchestration agent 733, key agent 714 obtains the key identifier associated with a container identifier for container 722. Key agent 714 may compute hash of the container to obtain the container identifier.

Key agent 714 accesses the key management service via key API 702 to request the data encryption key for the key identifier. The encryption key may be encrypted using a key encryption key (KEK), such as a KEK for a customer associated with container 722, in which case key agent 714 decrypts the encryption key. This may facilitate avoiding a man-in-the-middle attack. Key agent 714 feeds the encryption key to key setup 732 and encryption module 731.

Key setup 732 and encryption module 731 perform encryption/decryption of storage volume 734. Key setup 732 be a Linux Unified Key Setup (LUKS) disk encryption scheme, for instance. Encryption module 731 may be an encryption engine such as dm-crypt, for instance. With the appropriate encryption key for container 722 from computing system 750, encryption module 731 unlocks the storage volume 731 for the container 722. Host computing device 712A may then begin executing container 722.

After container 722 has finished execution, encryption module 731 can discard the encryption keys. Thus, no further access to the encrypted data is possible by any process on host computing device 712A.

In some cases, host computing device 712A executes an interface (not shown) for management of the encryption key namespace. The interface may be a command-line interface or graphical user interface, for example. A user may invoke the interface to associate an encryption key to a container and also to delete the association. In some cases, key API 702 may enable management of the encryption key namespace. For example, a method of key API 702 may allow a user may associate an encryption key to a container and also to delete the association. Computing system 750 may store these associations and also push the associations to the encryption key namespaces for the host computing devices 712. For example, computing device 750 may invoke the above-mentioned interface for management of the encryption key namespace. Computing system 750 may determine the set of host computing devices 712 associated with the customer or tenant for container 722, and configure each of these set of host computing devices 712 with an encryption key namespace having the association of the encryption key identifier and the container identifier. As a result, container 722 may migrate to any of these set of host computing devices 712 and be able to automatically unlock the storage volume 734 for the container 722 without manual configuration of the encryption key for the container in the destination host computing device 712.

As already described, the encryption key namespace related information can be stored in a local configuration file, encryption key namespace configuration 718. In some cases, encryption key namespace configuration 718 may be encrypted using a customer's API key. The encryption key namespace stored in the key namespace configuration 718 will be unlocked when container 722 is loaded. As part of an initial sequence, key agent 714 decrypts the encryption key namespace configuration 718 in memory.

Figure 8:
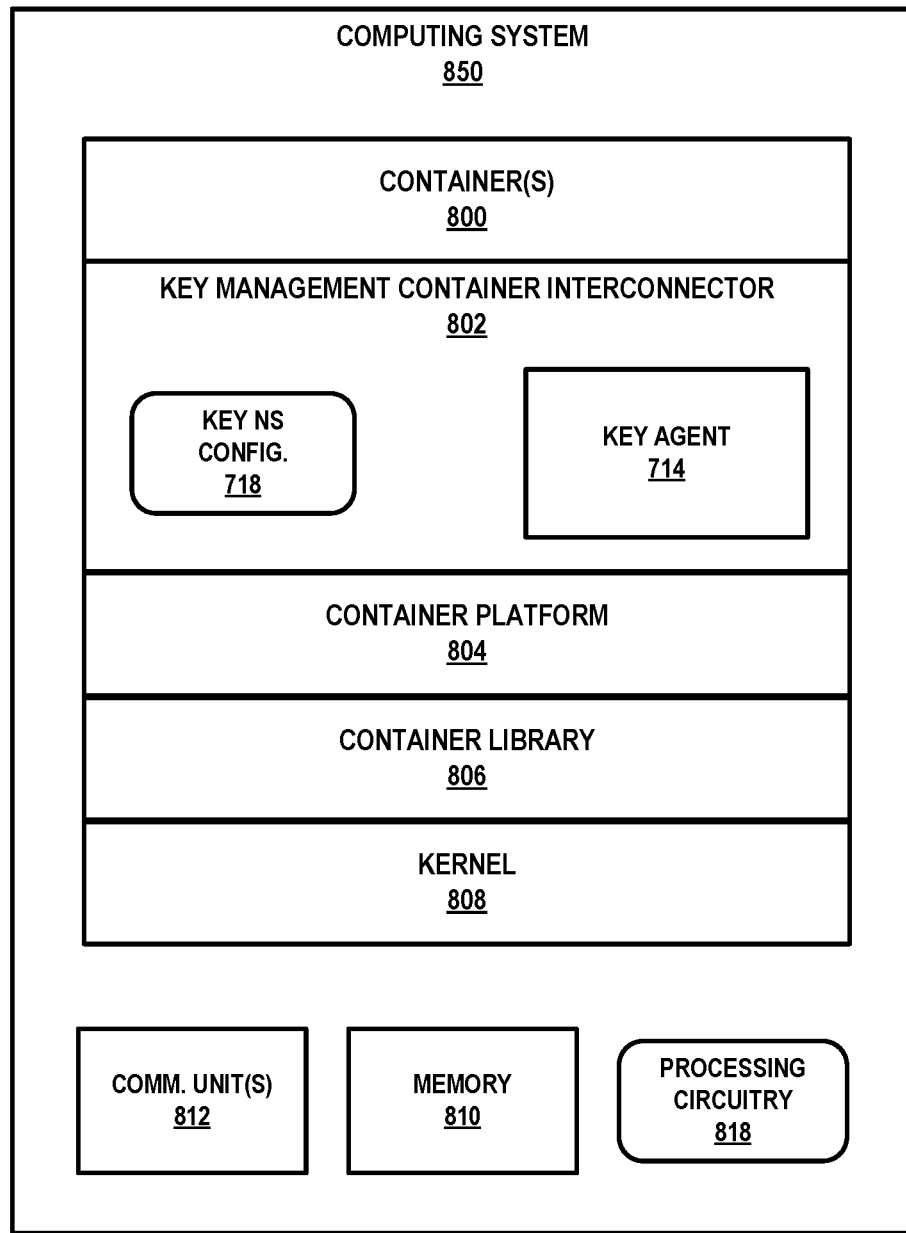
FIG. 8 is a block diagram illustrating an example stack for containers using a separate namespace for encryption keys used by the containers, in accordance with one or more aspects of the present disclosure.

FIG. 8 is a block diagram illustrating an example stack for containers using a separate namespace for encryption keys used by the containers, in accordance with one or more aspects of the present disclosure. Computing device 850 may represent an example of any of host computing devices 712.

The stack includes kernel 808, container library 806, container platform 804, and key management container interconnector 802 to support one or more container(s) 800. Kernel 808 may represent a Linux or other operating system kernel. Container library 806 and container platform 804 may be examples of Docker, rkt, or other container libraries and platforms. Key management container interconnector 802 is a set of data and utilities for interconnecting containers with their keys managed by a key management service. Key agent 714 and key namespace configuration 718 are as described with respect to FIG. 7. Key management container interconnector 802 may be installed to computing system 850 before executing containers 800, such as by a customer or tenant associated with containers 800.

Memory 810 may store information for processing during operation of the stack. In some examples, memory 810 may include temporary memories, meaning that a primary purpose of the one or more storage devices is not long-term storage. Memory 810 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 810, in some examples, also include one or more computer-readable storage media. Memory 810 may be configured to store larger amounts of information than volatile memory. Memory 810 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 810 may store program instructions and/or data associated with one or more of the modules described in accordance with one or more aspects of this disclosure.

Processing circuitry 818 and memory 810 may provide an operating environment or platform for the stack, which may be implemented as software, but may in some examples include any combination of hardware, firmware, and software. Processing circuitry 818 may execute instructions and memory 810 may store instructions and/or data of one or more modules. The combination of processing circuitry 818 and memory 810 may retrieve, store, and/or execute the instructions and/or data of one or more applications, modules, or software. Processing circuitry 818 and memory 810 may also be operably coupled to one or more other software and/or hardware components, including, but not limited to, one or more of the components illustrated in FIG. 8. Similar components may be used to provide an operating environment for the key agent 714, pod 720, orchestration agent 733, container platform 730, storage volume 734, encryption module 731, key setup 732, and key namespace configuration 718 of the computing device 712A of FIG. 7.

One or more communication units 812 of computing system 320 may communicate with devices external to computing system 850 by transmitting and/or receiving data, and may operate, in some respects, as both an input device and an output device. In some examples, communication units 812 may communicate with other devices over a network. In other examples, communication units 812 may send and/or receive radio signals on a radio network such as a cellular radio network. Examples of communication units 812 include a network interface card (e.g. such as an Ethernet card), an optical transceiver, a radio frequency transceiver, a GPS receiver, or any other type of device that can send and/or receive information. Other examples of communication units 812 may include Bluetooth®, GPS, 3G, 4G, and Wi-Fi® radios found in mobile devices as well as Universal Serial Bus (USB) controllers and the like.

Figure 9:
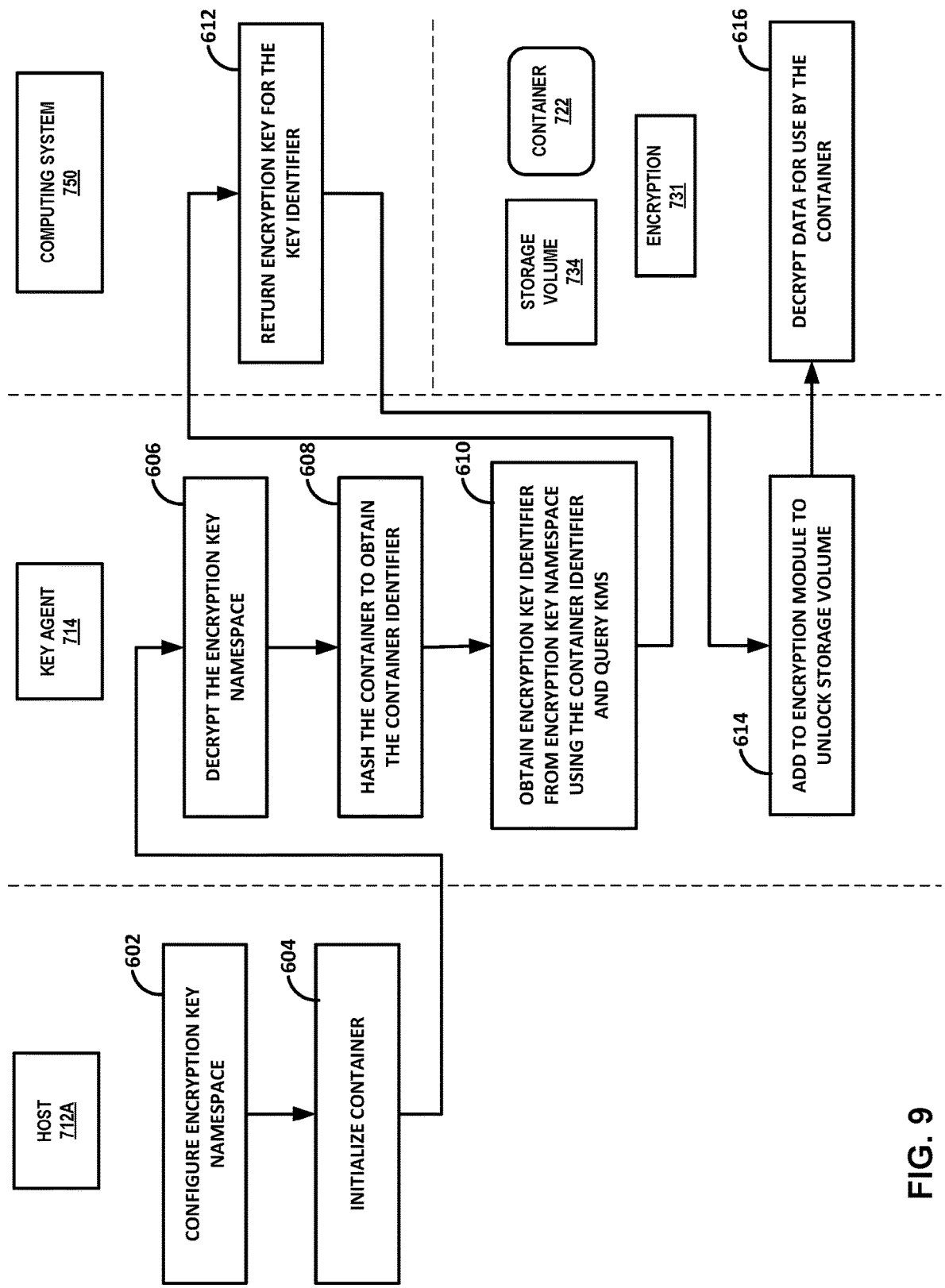
FIG. 9 is a flowchart illustrating an example mode of operation for a computing system having an encryption key namespace, in accordance with one or more aspects of the present disclosure.

FIG. 9 is a flowchart illustrating an example mode of operation for a computing system having an encryption key namespace, in accordance with one or more aspects of the present disclosure. Host computing device 712A is configured with an encryption key namespace (602). The encryption key namespace may be a Linux namespace and includes an association of a key identifier and a container identifier. Host computing device 712A initializes a container 722 (604).

As part of the initializing (or "launching") of the container 722, key agent 714 may optionally decrypt the encryption key namespace using a customer API key for a customer or tenant for the container 722 (606). Key agent 714 may compute a hash of the container 722 file system to obtain a hash value, which may be a unique identifier for container 722 (608). Key agent 714 obtains the key identifier from the encryption key namespace using the container identifier/hash value, based on the association (610). Key agent 714 queries a key management service, such as that provided by computing system 750, using the key identifier (610). The key management service returns the encryption key for the key identifier (612). The encryption key may be encrypted using a KEK.

Key agent 714 may first decrypt the encryption key using a KEK and then adds the encryption key to encryption module 731 (614). Encryption module 731 may then decrypt encrypted data in the storage volume 734 for container 722, the decrypted data for use by container 722 (616). Encryption module 731 may also encrypt data using the encryption key for storage to storage volume 734 in encrypted form.

Figure 10:
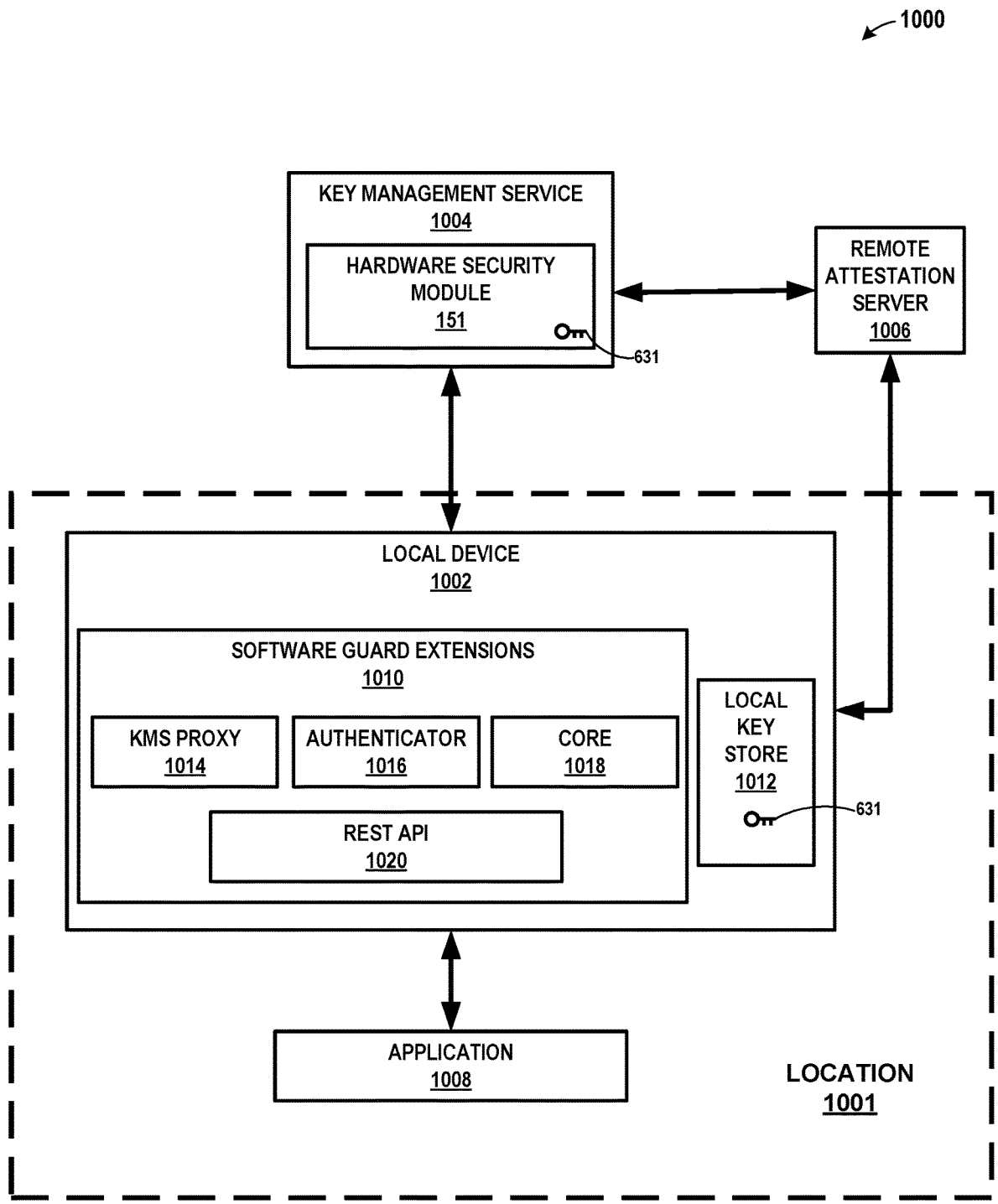
FIG. 10 is a block diagram illustrating an example system, in accordance with one or more aspects of the present disclosure.

FIG. 10 is a block diagram illustrating an example system in accordance with one or more aspects of the present disclosure. One or more of the cloud-based (e.g., remote or distributed) computing systems of the previous examples (e.g., system 700 of FIG. 7) may rely on continuous network access (e.g., an Internet connection) to provide functionality and access to data encryption and key management services (e.g., as provided by HSM 151 (FIG. 6) or computing system 750 (FIG. 7)). However, in a number of real-world examples, unplanned and/or planned network-access disruptions may inhibit one or more user applications from performing key or cryptographic operations via a SaaS-based key management service.

One particular example scenario which illustrates this problem is the use of a remote key management service (KMS) for applications inside retail stores. The local customer devices at a location, e.g., registers and/or point-of-sale (POS) devices used in retail stores, rely on the Internet to access a remote KMS 1004, as described elsewhere in this disclosure. On occasion, because of remote service failures, due for instance to a planned or unplanned network disruption at a location or a disruption or failure in the remote service itself, the local POS devices, running one or more user applications 1008, may be unable to connect to the remote KMS 1004. These interruptions may delay or stall store operations completely. In some particular examples, a company having over 10,000 physical locations may experience up to ten percent of them lacking Internet access at any given time. While not illustrated in FIG. 10, encryption and key management services of key management service 1004 may be accessible via an API, as described elsewhere in this disclosure.

In some examples in accordance with this disclosure, a computing system 1000, having components communicating via one or more networks, may incorporate a local computing device 1002 to temporarily provide the functionality for a remote KMS 1004 in the event of a network disruption or other remote service failure. As shown in FIG. 10, system 1000 includes local computing device 1002, remote or centralized key management service (KMS) 1004, remote attestation server 1006, and at least one local application 1008 running on at least one customer device. The at least one customer device executing application 1008 and the local computing device 1002 may be co-located at location 1001, which may represent a data center, a store or retail location, a home, or other geographic area in which one or more customer devices are collectively administered.

Local computing device 1002 includes a memory and processing circuitry defining at least one partition (e.g., virtual or physical) running software guard extensions 1010, and at least one memory partition 1012 functioning as a local encryption key store. In some examples, local key store 1012 may share a memory partition with the partition running software guard extensions 1010. In other examples, the two partitions may be partially or entirely distinct. Memory partitions may refer to main memory or to long-term storage locations (e.g., disk). Local computing device 1002 may be an INTEL SGX device that allows user-level code to allocate private regions of memory, the private regions being protected from processes running at higher privilege levels. This may facilitate local computing device 1002 (and in particular core 1018) providing secure cryptographic operations.

In some examples, local key store 1012 is encrypted with a user's password and account information. In examples in which local key store 1012 is distinct from the boundary of software guard extensions, there may be layer of encryption applied over the data stored in key store 1012. Because the access to key store 1012 may be through software guard extensions 1010, application 1008 may similarly only retrieve encryption keys 631 from inside software guard extensions 1010, e.g., using REST API 1020. Once core 1018 completes its cryptographic operations, key 631 is encrypted and stored back within local key store 1012. In the event that an unauthorized user gained access to local device 1002, the unauthorized user they could at worst destroy the local key store 1012, but could not otherwise access the encryption keys 631 from the local key store 1012. In some examples, data stored in local key store 1012, is "wrapped" using multiple keys, one of which may include the customer's own password from when they create their account. Additionally, KMS 1004 may include a master key and a cluster key, both of which can be used to multiple-wrap the actual encryption key 631.

Software guard extensions 1010 include a set of executable instructions and corresponding hardware built into some modern processing circuitry, as well as some computing devices' operating systems. Software guard extensions 1010 are configured to designate one or more private, isolated memory partitions, commonly referred to as "enclaves," whose stored data is secured such that the data cannot be accessed, saved, or altered outside of the enclave itself. Software guard extensions 1010 include key forwarder 1014, authenticator 1016, core 1018, and representational state transfer (REST) application programming interface (API) 1020.

Remote attestation server 1006 includes a remote (e.g., from local device 1002 and/or the device running application 1008) server configured to authenticate local device 1002 with one or more user accounts, in order to allow local device 1002 to connect to KMS 1004 and receive encryption keys 631. In some examples, remote attestation server is a shared server with central KMS 1004. In other examples, remote attestation server is distinct from, and remote from, the servers or other computing devices running central KMS 1004. Before local device 1002 can perform cryptographic operations for a user, local device 1002 must have authorization from remote attestation server 1006. Local device 1002 contacts remote attestation server 1006, which returns an authorization code, after which core 1018 may load cryptographic software protected by software guard extensions 1010. When a user activates local device 1002 at the user's location, local device 1002 will attest itself, via remote attestation server 1006, to be part of the central KMS cluster 1004, but I having only a particular set of accounts, which are specific to that user.

Application 1008 includes any end-user software or service running on a local end-user device. For example, an end-user device may include a point of sale (POS) device within a retail store, such as a register and/or credit-card reader. In these examples, application 1008 includes the POS software configured to authenticate the card and authorize the user's purchase via the central bank that issued the card.

Authenticator 1016 includes one or more modules configured to authorize local device 1002 to interact within computing system 1000 on behalf of one or more user accounts. For example, authenticator 1016 may be configured to connect to central KMS 1004 and/or remote attestation server 1006 such that a user may confirm that local device 1002 is in his or her physical possession and/or is authorized to perform cryptographic operations for user application 1008.

Core 1018 includes one or more modules configured to perform the actual cryptographic operations for local device 1002. Cryptographic operations may include, for example, general data encryption or decryption, or the use and management of one or more encryption keys 631.

REST API 1020 is an application programming interface configured to define a set of constraints to be used for creating Web services. User applications 1008 may consume encryption keys 631 directly through REST API 1020 and otherwise request services via REST API 1020. REST API 1020 may be similar to, and in some cases mirror, an API for KMS 1004 and in this way offer methods for data encryption, key management, login/auth, and so forth.

Local device 1002 further includes KMS proxy 1014. Application 1008 is configured to send service requests for KMS 1004 to local device 1002. For example, application 1008 may be configured with an IP address, URL, network computer name, or other identifier for local device 1002 by which application 1008 may send communication to local device 1002.

In some examples in accordance with this disclosure, KMS proxy 1014 forwards requests from application 1008 for services provided by KMS 1004. For example, application 1008 may send communication to local device 1002 to invoke REST API 1020 to send a service request to encrypt transaction data generated by a POS terminal. KMS proxy 1014 processes the service request, generates a new service request based on the service request, and sends the new service request to KMS 1004 to invoke the corresponding service provided by KMS 1004. To generate the new service request, KMS proxy 1014 may rewrite the IP header, modify application data to specify the corresponding method of KMS 1004 for the service being requested by application 1008, or otherwise generate a new service request to invoke a corresponding service of KMS 104 to the service invoked at REST API 1020. Again, in this example, the requested service is for data encryption, but other services are contemplated such as those described above. In this way, KMS proxy 1014 "forwards" or proxies service requests from application 1008 to KMS 1004. Service traffic can include service requests and service responses. Service traffic may include application layer data (e.g., JSON/XML) for invoking methods of REST API 1020.

KMS 1004 processes the new service request, performs the service, and may send a service response to local device 1002. KMS proxy 1014 may proxy the service response to application 1008 as a response for the invoked method of REST API 1020.

In accordance with techniques described in this disclosure, local device 1002 may perform key management and/or data encryption services on behalf of KMS 1004 in the event of service failure of KMS 1004 due, e.g., to a network failure. For example, local device 1002 may allow access to encryption keys 631 (FIG. 6) to one or more user applications 1008, which cannot directly connect to remote KMS 1004, for a period of time, after which local device 1002 may require re-authentication to continue providing KMS functionality. As another example, core 1018 may perform encryption/decryption of data using key 631 in response to requests from application 1008. In this way, local device 1002 temporarily assumes the service functionality of KMS 1004 until an end condition is met. For example, an end condition may include local device 1002 determining that the network connection to remote KMS 1004 has been re-established or that the remote KMS 1004 is otherwise again available to provide services. In other examples, an end condition may include a "maximum authentication time" that may pass after local device 1002 has most recently been authenticated with remote KMS 1004 or remote attestation server 1006, after which time local device 1002 may automatically disable its service functionality until local device 1002 becomes re-authenticated.

The maximum authentication time for which local device 1002 is permitted to assume service functionality for KMS 1004 before re-authentication of local device 1002 to KMS 1004 is required may be configurable by an administrator. For example, a user may define either a relatively short or a relatively longer maximum authentication time. A relatively shorter authentication time (e.g., between the order of a few minutes and a few hours) may provide better security, in that it defines a shorter window in which an unauthorized user could attempt to gain access to stored encryption keys 631. However, a shorter authentication time may also limit the functionality of application 1008 via local device 1002, in the event that the shorter authentication time runs out (e.g., expires) before network access is restored. Conversely, a relatively longer maximum authentication time (e.g., 24 hours or longer) may provide continuous functionality for user application 1008 at the expense of marginally decreased network security.

Local device 1002 may be configured to store one or more encryption keys 631 within local key store 1012 and perform cryptographic operations for application 1008 via a local network. Local device 1002 may include an independent entity (e.g., physically distinct device such as an HSM) that may operate locally inside a user's premises as an appliance to run software guard extensions 1010 to secure a user's encryption keys 631. Local device 1002 may host one or more encryption keys 631 required by user applications 1008. Local device 1002 may be connected and available inside the local network of the applications 1008. KMS 1004 may delegate encryption keys after establishing trust (e.g., authenticating) with local device 1002.

Local device 1002 may provide one or more services or features, including offline-mode functionality; key-management delegation for a user-defined duration, (after which re-authentication is required); and authentication and authorization from a centralized KMS 1004. In some examples, local device 1002 may be unable to create or generate new encryption keys but rather receives and stores encryption keys from KMS 1004. In other examples, local device 1002 may be configured to provide full key management functionality, including the creation of new encryption keys, which may then synchronize with central KMS 1004 once network access or the KMS 1004 service has otherwise been restored.

In some examples, local device 1002 may define offline-mode functionality, in which network connectivity to remote KMS 1004 is unavailable or the KMS 1004 service has otherwise failed. In offline mode, local device 1002 will stop contacting central KMS 1004 for any operations and instead locally performs key management and/or data encryption services instead of KMS 1004. Local device 1002 will locally execute all key management requests from application 1008 until offline mode is deactivated (e.g., network connectivity has been restored) and the KMS 1004 is again online and operational to perform the key management and/or data encryption services. In some examples, local device 1002 may be configured to automatically operate in offline mode upon determining a loss of connectivity to central KMS 1004 for longer than a timeout value. In other examples, local device 1002 may include a hardware toggle switch or may be configurable via a user interface to manually activate offline mode.

In general, the mode of local device 1002 (online or offline) determines the operations of KMS proxy 1014. In online mode, KMS proxy 1014 forwards service requests and responses between application 1008 and KMS 1004. In offline mode, KMS proxy 1014 forwards service requests and responses between application 1008 and core 1018, where core 1018 performs the key management and/or data encryption services for local device 1002.

More specifically, in some examples, local device 1002 may define online-mode functionality, in which network access to central KMS 1004 is available. In online mode, local device 1002 may be configured to act as a proxy for the central KMS. For example, local device 1002 may be located within the communication path between application 1008 and central KMS 1004, and exchange or forward data between the two entities. In other words, in the "normal" or "online" mode, local device 1002 serves as a passthrough proxy, in that local device 1002 directly forwards all application operations to KMS 1004. Local device 1002 subsequently passes the results and responses back to application 1008. Whether in "offline" mode or "online" mode, application 1008 may be configured to always connect to the available instance of local device 1002.

In some examples, a user may transfer encryption keys into local device 1002 by directly connecting local device 1002 over the Internet to central KMS 1004, or manually if local device 1002 is not connected to central KMS 1004, such as by a user interface or a portable storage device. In some examples, local device 1002 may include hardware configured to support software guard extension technology 1010.

In some examples, local device 1002 may use password-based key-derivation functions (PBKDF1 and/or PBKDF2) to register itself with central KMS 1004 and/or remote attestation server 1006. This registration may expire after one or more combination of criteria is met, such as: a timeout value (e.g., 60 minutes); a number of key operations (e.g., 1000 key operations); and/or a duration since last authentication via remote attestation server 1006 (e.g., 7 days).

In some examples of system 1000, user applications 1008 may be configured to connect to local device 1002 the same way they would otherwise connect to central KMS 1004, except that applications 1008 will direct traffic to the IP address or URL for local device 1002 rather than to the IP address or URL for KMS 1004 (e.g., http://centralKMS.io).

In some examples, local device 1002 may be configured to "rotate" encryption keys to add an additional layer of security. For example, local device 1002 may be configured to determine that no single encryption key is stored within local key store 1012 for longer than a determined maximum period of time. For example, local device 1002 may be configured to periodically "flush" the cache of local key store 1012, for example, after every seven days.

Figure 11:
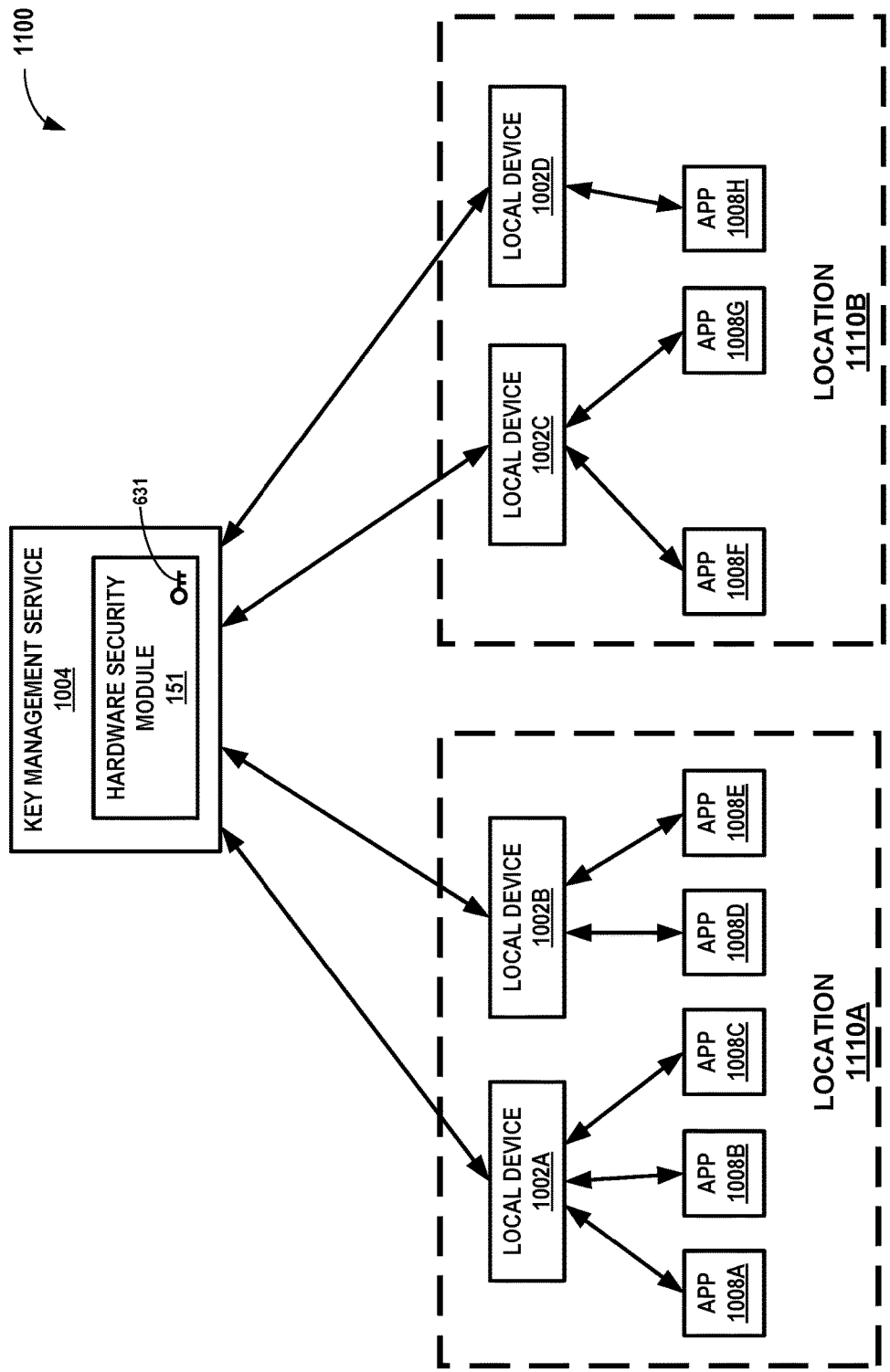
FIG. 11 is a block diagram illustrating an example system, in accordance with one or more aspects of the present disclosure.

FIG. 11 is a block diagram illustrating an example computing system 1100, in accordance with one or more aspects of the present disclosure. Specifically, FIG. 11 depicts a networked computing system including a plurality of local devices 1002A-1002D (collectively, "local devices 1102"), each operating locally within a physical location 1110A, 11010B (collectively, "locations 1110"), and connected to (e.g., in data communication with) a central KMS 1004. The integration of local devices 1002 (FIG. 10) may provide additional benefits beyond offline-mode functionality in the event of a network or other KMS 1004 service disruption. The techniques of this disclosure provide a number of technical solutions to one or more technical problems. For example, local devices 1002 may allow performance-scaling of central KMS 1004, such as in cases where a large number of user applications 1008A-1008H (collectively, "applications 1008") from multiple locations 1110 are trying to reach (e.g., connect to) central KMS 1104 simultaneously. User applications 1008 may be directed to one or more local devices 1102 inside local networks, thereby reducing the amount of traffic going over the Internet to central KMS 1104.

For example, a performance bottleneck of central KMS 1004 may result from the encryption/decryption operations performed by central KMS 1004, rather than the network bandwidth (e.g., the number of applications 1008 that may connect to central KMS 1004 at one time). For example, some operations, such as "sign and verify," which are very typical in credit-card applications, are especially computationally heavy, consuming many processing cycles. Many of these operations may be delegated to local devices 1002, freeing up processing power within central KMS 1004. KMS 1004 may detect a large processing load for service request processing and direct one or more of local devices 1002 to go into offline mode to process the service requests from applications 1008 connected to those local devices 1002.

In one particular example, a large event, such as a conference big sporting event, could result in a sudden rush of transactions on applications 1008 on various POS devices. In this example, management at a particular location 1110 could deploy additional local devices 1002, manually activated in "offline mode," to handle the additional load.

In some examples, local device 1002 may improve the availability of central KMS 1004 to latency-sensitive applications 1008. For example, because local device 1002 operates within a local network, latency may be significantly reduced.

In some examples, local devices 1002 may provide a reduced attack surface for potential security threats. For example, the delegation of the functionality of central KMS 1004 to local devices 1002 may significantly reduce the number of endpoints communicating directly to central KMS 1004, thereby also reducing the attack surface. For example, applications 1008 in some deployments may often use one common API key to contact central KMS 1004. If the security of one application 1008 becomes compromised, then the complete set of encryption keys for an organization (e.g., user account) may become exposed. However, as described herein, by distributing the functionality of central KMS 1004 across a plurality of local devices 1002, each local device 1002 operating independently of all the others, the complete set of encryption keys for an organization may remain secured.

In some examples, users of applications 1008 may select a particular instance of local device 1002 with which to connect. Applications 1008 may then store a topology map using any suitable method. If application 1008 decides to connect with KMS 1004 directly, then the owners of application 1008 may be responsible to configure the application 1008 with identifying data for KMS 1004. However, in terms of functionality, the interaction between applications 1008 and local devices 1002 may be essentially functionally equivalent to the direct interaction between applications 1008 and KMS 1004, at least from the perspective of applications 1008.

Multiple local devices 1002 within system 1100 may each operate independently. User applications 1008 are configured to communicate to a respective local devices 1002 instead of with central KMS 1004 directly. For example, as shown in FIG. 11, location 1110A includes five active user applications 1008 and you two local devices 1002. In this example, three instances of application 1008 interact with local device 1002A, and the other two applications 1008 with local device 1002B. Because local devices 1002A, 1002B are not connected to each other, they function independently, and they also connect to central KMS 1004 and go through the respective authentication and operation processes on their own. This system allows users to customize the application environment (e.g., allocate resources) according to unique individual needs. The example of FIG. 11 does not include clustering, since these local devices 1002 function independently. However, in some deployments, multiple local devices 1002 may be deployed in a cluster to process service requests at a location. The multiple local devices 1002 may be accessible via a load balancer or gateway that distributes service requests among the local devices of the cluster.

Figure 12:
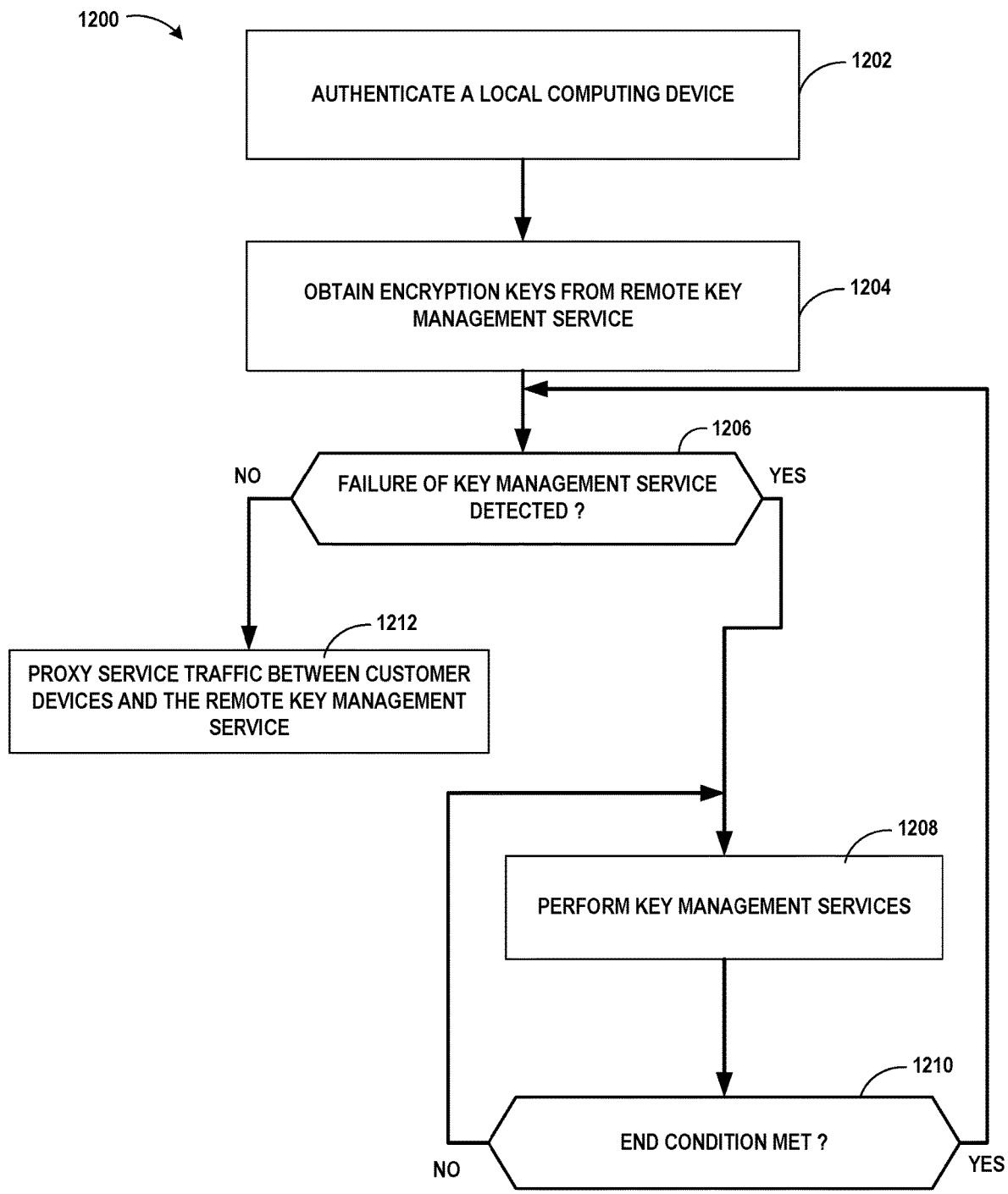
FIG. 12 is a flow diagram illustrating an example mode of operation for a system, in accordance with one or more aspects of the present disclosure.

FIG. 12 is a flow diagram illustrating an example method 1200, in accordance with one or more techniques of the present disclosure. The techniques of FIG. 12 are described with respect to system 1000 of FIG. 10, but may be performed by any adequate computing system. A local computing device 1002 (e.g., local to an end user) is added to a networked computing system and authorized to access one or more user accounts (1202). For example, the local computing device may be configured to connect to a remote attestation server 1006, through which a user may authorize the local device 1002 to participate in the broader computing network 1000 (e.g., send, process, and receive data, including encrypted data).

In some examples, local computing device 1002 may be connected along a data communication path between a user application 1008 (e.g., running on a distinct local customer computing device) and a remote data encryption and key management service (KMS) 1004 (e.g., running on a remote server). For example, local computing device 1002 may be configured to receive (e.g., intercept) secure objects, such as one or more encryption keys 631, from the remote KMS 1004 (1204). Local computing device 1002 may store a local copy of the encryption keys within a secure local memory (e.g., local key store 1012) as well as proxy data communications between remote KMS 1004 and local application 1008. In some examples, KMS proxy 1014 requests and receives secure objects, such as encryption key 631, from KMS 1004.

In some examples, local computing device 1002 may be configured to periodically determine whether remote KMS 1004 is operational to provide services (1206). For example, local device 1002 may "ping" the remote KMS 1004 at a given frequency, or in response to every data communication received from local application 1008, and then determine whether the response from central KMS 1004 is satisfactory. In the event that the response from central KMS 1004 is excessively delayed or non-existent, local device 1002 determines that there has been a failure of KMS 1004 (YES branch of 1206), and automatically activates an "offline mode" functionality. In some examples, such as for planned network outages, local device 1002 may include a switch, toggle, or other user input configured to manually activate the same offline-mode functionality. If the KMS 1004 is operational and accessible to local computing device 1002, failure has not been detected (NO branch of 1206), and local computing device 1002 continues proxying service traffic between customer devices and the remote KMS 1004 (1212).

When in offline mode, local device 1002 is configured to temporarily perform a local delegation of the data encryption and/or key management services of the remote KMS 1004 (1208). For example, local device 1002, via a set of secure software guard extensions 1010, may perform encryption and decryption of data for local application 1008 using the duplicate encryption keys stored in local key store 1012 (1208). For example, software guard extensions (e.g., data security software and the hardware configured to support it) may designate an isolated partition of memory within local device 1002, commonly referred to as an "enclave," through which local device 1002 performs local encryption and decryption such that no other process can access or alter the data. In some examples, the duplicate encryption keys 631 stored in local key store 1012 may themselves be "wrapped" in multiple layers of encryption, adding further security to the system.

In the interest of further increased security, local device 1002 may be configured to disable its encryption and key management operations upon satisfying one or more end conditions (1210). For example, local device 1002 may be configured to disable operations after the expiration of a pre-determined time period since the last time the device was authenticated. For example, the offline-mode functionality of the local device 1002 may be configured to expire 24 hours after its last authentication, after which local device 1002 must connect to central KMS 1004 to re-authenticate in order to resume operations. In other examples, offline-mode functionality may expire upon local device 1002 identifying that the network connection to remote KMS 1004 has been re-established. In some examples, offline mode functionality may expire upon whichever of these conditions occurs first.

While local computing device 1002 has an active connection to remote KMS 1004 and remote KMS 1004 is providing services (1206), local device 1002 operates in an "online mode" functionality (1206). While in online mode, local device 1002 is configured to proxy service traffic between applications 1008 running on customer devices and remote KMS 1004 (1212).

FIG. 1 through FIG. 5, FIG. 6A through FIG. 6F, and FIG. 7 through FIG. 11 each illustrate at least one example cloud exchange, cloud exchange point, data center, computing system or other system. The scope of this disclosure is not, however, limited to the specific systems or configurations illustrated. Accordingly, other example or alternative implementations of systems illustrated herein, beyond those illustrated in the Figures, may be appropriate in other instances. Such implementations may include a subset of the devices and/or components included in the example(s) described in the Figures and/or may include additional devices and/or components not shown in the Figures.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices are shown within the Figures and/or in other illustrations referenced herein. However, techniques in accordance with one or more aspects of the present disclosure may be performed with many more of such systems, and collective references to components, devices, modules, and/or systems may represent any number of such components, devices, modules, and/or systems.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 7) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, Flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   authenticating a local computing device to a remote key management service (KMS) accessible to the local computing device via a network, wherein the remote KMS provides services comprising one or more of data encryption services and key management services, and wherein the local computing device comprises software guard extensions for performing, by the local computing device, key management services within a private memory region inaccessible to other processes external to the software guard extensions;
   obtaining, by the local computing device, an encryption key from the remote KMS;
   storing, by the computing device, the encryption key in a local key store;
   proxying, by the local computing device, first service traffic between one or more customer devices and the remote KMS;

transitioning, by the local computing device, a mode of the local computing device into offline mode;
receiving, by the local computing device, second service traffic from the one or more customer devices; and
processing, by the local computing device based on the mode of the local computing device being offline mode, the second service traffic using the encryption key.

2. The method of claim 1, further comprising:
receiving third service traffic;
dropping, in response to determining an end condition for processing service traffic is satisfied, the third service traffic.

3. The method of claim 2, wherein the end condition comprises:
a maximum time duration since a most recent authentication of the local computing device to the remote KMS; or
a reestablishment of network connectivity between the local computing device and the remote KMS.

4. The method of claim 2, wherein the end condition comprises a maximum number of key operations performed by the computing device.

5. The method of claim 3, further comprising:
prompting, by the computing device, a user for re-authentication in response to determining the end condition is satisfied.

6. The method of claim 1, wherein authenticating the computing device comprises receiving user authentication via a remote attestation server.

7. The method of claim 1, wherein proxying the first service traffic comprises proxying, by the local computing device, the first service traffic based on the mode of the local computing device being online mode.

8. The method of claim 1, wherein transitioning the mode of the local computing device into offline mode comprises transitioning in response to detecting a switch toggle of a switch of the local computing device.

9. The method of claim 1, wherein transitioning the mode of the local computing device into offline mode comprises transitioning in response to detecting multiple failures to access the remote KMS.

10. The method of claim 1, wherein transitioning the mode of the local computing device into offline mode comprises transitioning in response to detecting connectivity failure with the remote KMS for a threshold amount of time.

11. The method of claim 1, wherein transitioning the mode of the local computing device into offline mode comprises receiving a command from the remote KMS to transition into offline mode.

12. The method of claim 1, wherein processing the second service traffic comprises encrypting data and returning the encrypted data to an issuer of the second service traffic.

13. The method of claim 1, wherein processing the second service traffic comprises returning the encryption key to an issuer of the second service traffic.

14. A computing device comprising processing circuitry coupled to a memory, wherein the computing device further comprises software guard extensions, and wherein the processing circuitry is configured to:
obtain an encryption key from a remote KMS that provides services comprising one or more of data encryption services and key management services;
store an encryption key in a local key store;
proxy first service traffic between one or more customer devices and the remote KMS;
transition a mode of the local computing device into offline mode;
receive second service traffic from the one or more customer devices; and
process, based on the mode of the local computing device being offline mode, the second service traffic using the encryption key, wherein to process the second service traffic, the processing circuitry uses the software guard extensions to perform key management services within a private memory region inaccessible to other processes external to the software guard extensions.

15. The computing device of claim 14, wherein the processing circuitry is further configured to:
receive third service traffic;
drop, in response to a determination an end condition for processing service traffic is satisfied, the third service traffic.

16. The computing device of claim 14, wherein to proxy the first service traffic the processing circuitry is configured to proxy the first service traffic based on the mode of the local computing device being online mode.

17. The computing device of claim 14, wherein the processing circuitry configured to:
transition the mode of the local computing device into offline mode by detecting connectivity failure with the remote KMS for a threshold amount of time.

18. A non-transitory computer-readable medium configured with instructions for causing a computing device that includes software guard extensions to perform operations comprising:
obtaining an encryption key from a remote KMS that provides services comprising one or more of data encryption services and key management services;
storing an encryption key in a local key store;
proxying first service traffic between one or more customer devices and the remote KMS;
transitioning a mode of the local computing device into offline mode;
receiving second service traffic from the one or more customer devices; and
processing, based on the mode of the local computing device being offline mode, the second service traffic using the encryption key, wherein processing the second service traffic includes using the software guard extensions to perform key management services within a private memory region inaccessible to other processes external to the software guard extensions.

* * * * *